(12) United States Patent
Ozaki et al.

(10) Patent No.: US 6,943,958 B2
(45) Date of Patent: Sep. 13, 2005

(54) ZOOM LENS SYSTEM AND CAMERA USING THE SAME

(75) Inventors: Hiroyasu Ozaki, Tokyo-to (JP); Masahiro Imamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/917,483

(22) Filed: Aug. 13, 2004

(65) Prior Publication Data

US 2005/0041302 A1 Feb. 24, 2005

(30) Foreign Application Priority Data

Aug. 20, 2003 (JP) ........................................ 2003-296444
Aug. 20, 2003 (JP) ........................................ 2003-296446

(51) Int. Cl.[7] .............................................. G02B 15/14
(52) U.S. Cl. ........................ 359/680; 359/681; 359/682; 359/691
(58) Field of Search ................................ 359/680–682, 359/686, 689, 691

(56) References Cited

U.S. PATENT DOCUMENTS 4,147,410 A * 4/1979 Shimomura et al. ........ 359/680

FOREIGN PATENT DOCUMENTS

| JP | 60-130712 | 7/1985 |
| JP | 62-200316 | 9/1987 |
| JP | 10-082954 | 3/1998 |

* cited by examiner

*Primary Examiner*—Georgia Epps
*Assistant Examiner*—Jack Dinh
(74) *Attorney, Agent, or Firm*—Kenyon & Kenyon

(57) ABSTRACT

The zoom lens system and camera using the same include, in order from an object side, a first lens group having negative refracting power and a second lens group having positive refracting power. Zooming is carried out at least by changing the distance between the first and second groups. The first lens group includes six lenses, a first lens which is negative meniscus lens having a concave surface toward an image side, a second lens which is negative meniscus lens having a concave surface toward the image side, a third lens which is negative lens having a concave surface toward the image side, a fourth lens which is positive lens having convex surfaces, a fifth lens having negative power and a sixth lens having positive power. The second lens group includes six lenses and the following condition is satisfied.

$$0.07 < d12/f2G < 0.30$$

where d12 is an air space on an optical axis between the first lens and the second lens in the second lens group, and f2G is a focal length of the second lens group.

43 Claims, 14 Drawing Sheets

FIG.2A  FIG.2B  FIG.2C  FIG.2D
SPHERICAL ABERRATION  ASTIGMATISM  DISTORTION  CHROMATIC ABERRATION OF MAGNIFICATION
FNO 2.850   IH=11.64   IH=11.64   IH=11.64
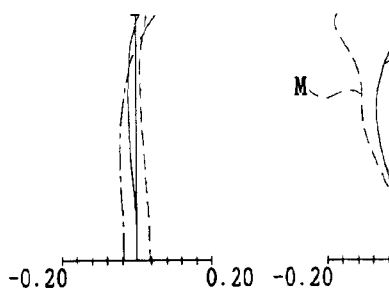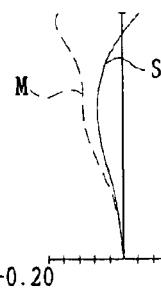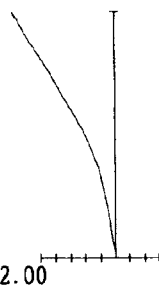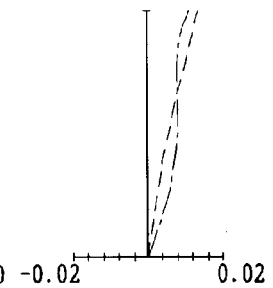
-0.20   0.20  -0.20   0.20  -2.00   2.00  -0.02   0.02
FIG.2E  FIG.2F  FIG.2G  FIG.2H
FNO 3.164   IH=11.64   IH=11.64   IH=11.64
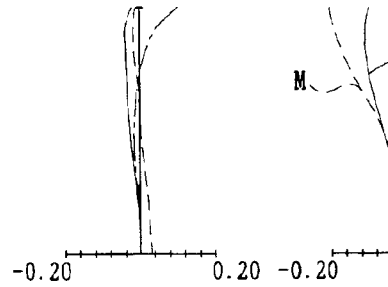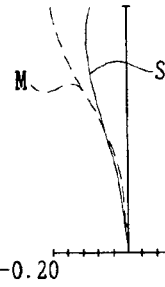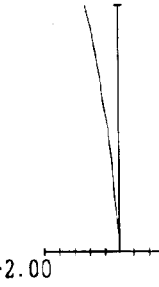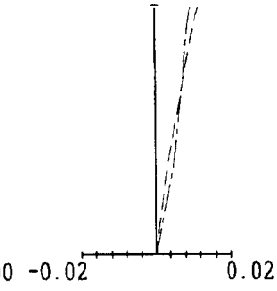
-0.20   0.20  -0.20   0.20  -2.00   2.00  -0.02   0.02
FIG.2I  FIG.2J  FIG.2K  FIG.2L
FNO 3.526   IH=11.64   IH=11.64   IH=11.64
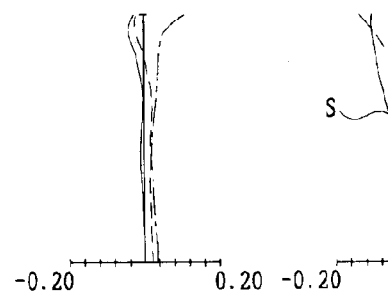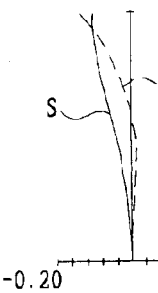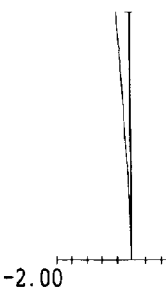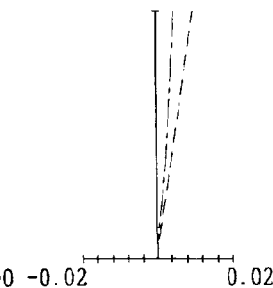
-0.20   0.20  -0.20   0.20  -2.00   2.00  -0.02   0.02
—·—·— 435.84
— — — 656.27
——— 587.56

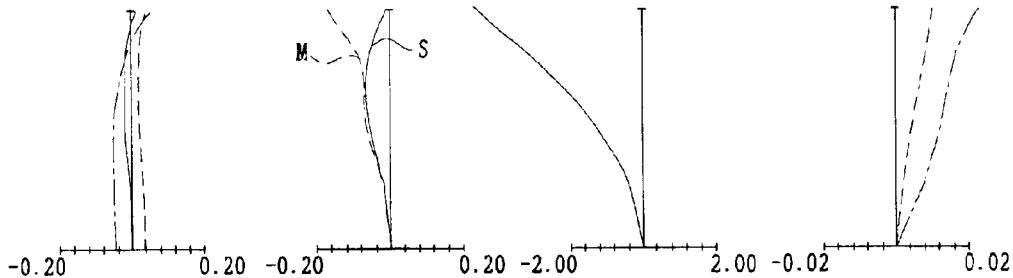
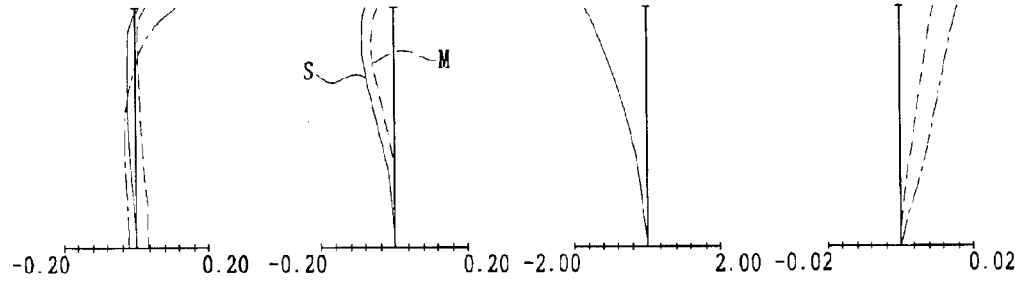
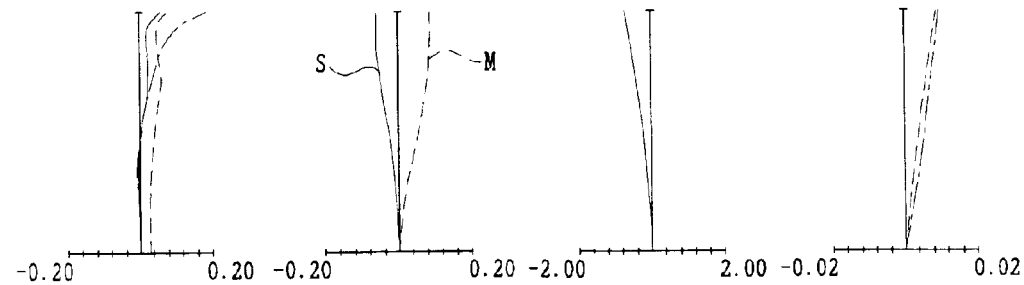

FIG.5A — SPHERICAL ABERRATION — FNO 2.850
FIG.5B — ASTIGMATISM — IH=11.64
FIG.5C — DISTORTION — IH=11.64
FIG.5D — CHROMATIC ABERRATION OF MAGNIFICATION — IH=11.64
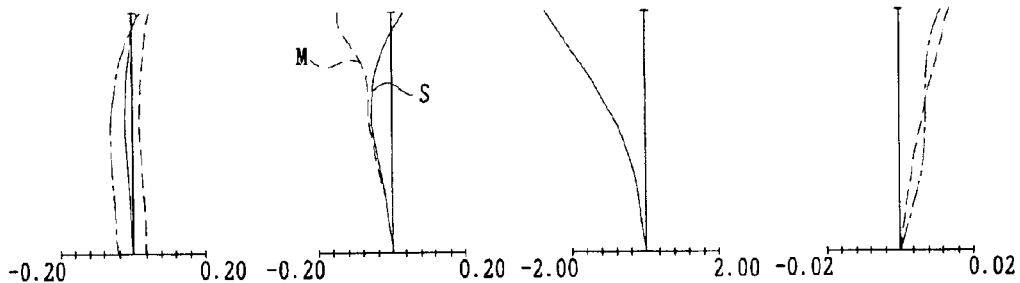
FIG.5E — FNO 3.139
FIG.5F — IH=11.64
FIG.5G — IH=11.64
FIG.5H — IH=11.64
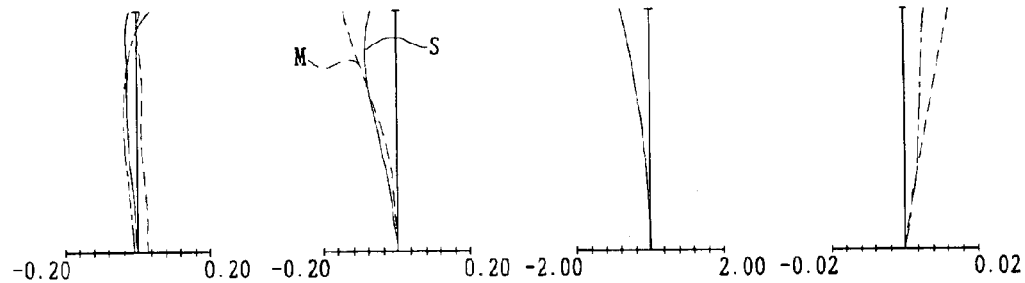
FIG.5I — FNO 3.480
FIG.5J — IH=11.64
FIG.5K — IH=11.64
FIG.5L — IH=11.64
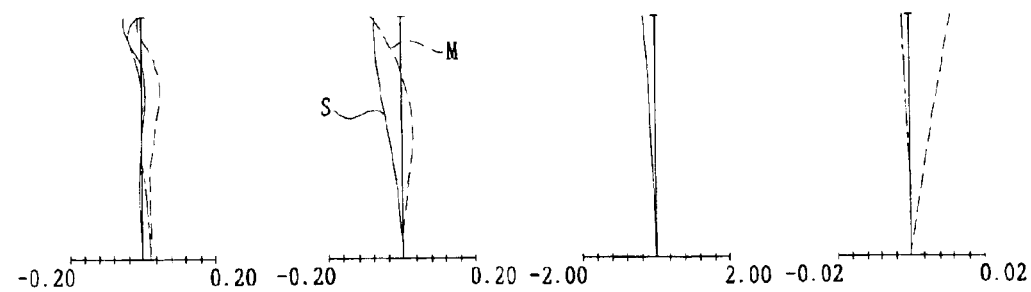
—·—·— 435.84
—————— 656.27
——————— 587.56

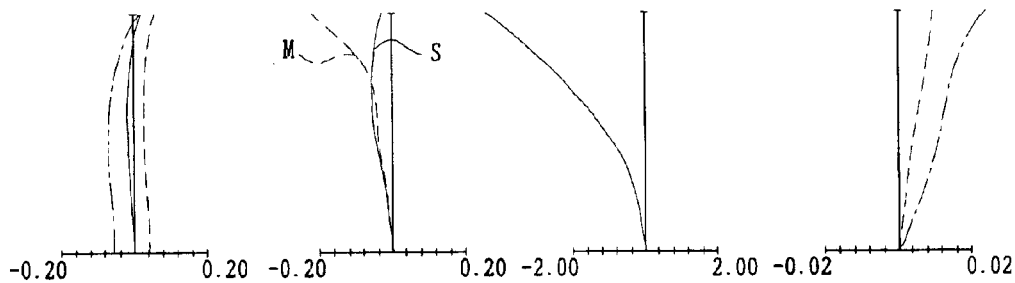

FIG.8A — SPHERICAL ABERRATION — FNO 2.850
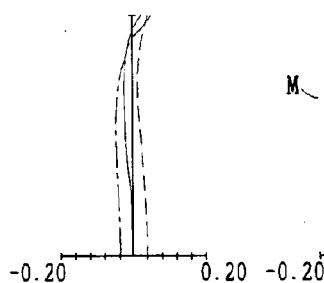
FIG.8B — ASTIGMATISM — IH=11.64
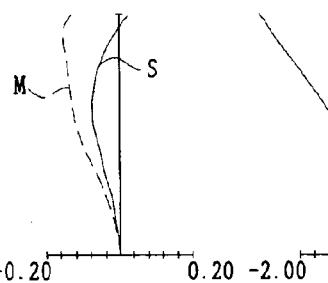
FIG.8C — DISTORTION — IH=11.64
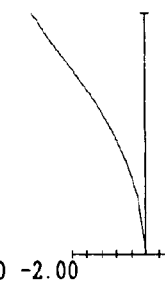
FIG.8D — CHROMATIC ABERRATION OF MAGNIFICATION — IH=11.64
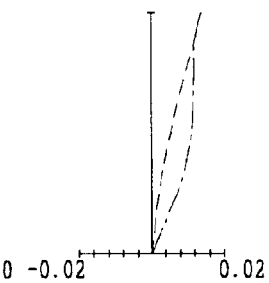
FIG.8E — FNO 3.151
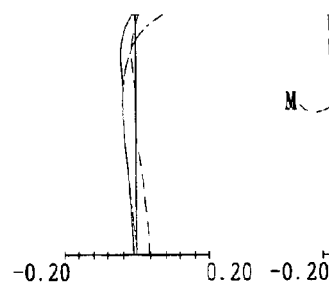
FIG.8F — IH=11.64
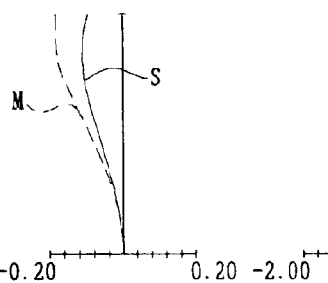
FIG.8G — IH=11.64
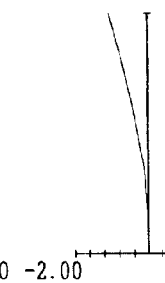
FIG.8H — IH=11.64
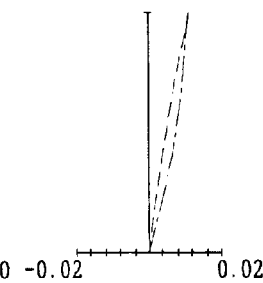
FIG.8I — FNO 3.506
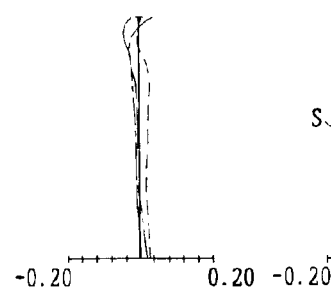
FIG.8J — IH=11.64
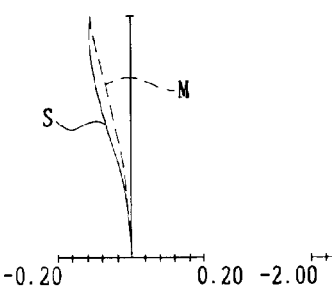
FIG.8K — IH=11.64
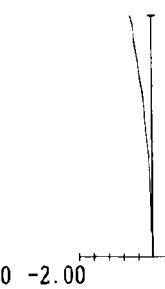
FIG.8L — IH=11.64
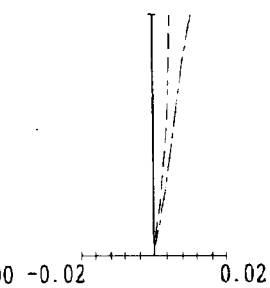
—·—·— 435.84
— — — 656.27
——— 587.56

FIG.9A SPHERICAL ABERRATION
FIG.9B ASTIGMATISM
FIG.9C DISTORTION
FIG.9D CHROMATIC ABERRATION OF MAGNIFICATION
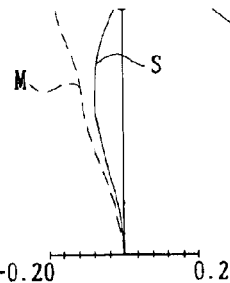
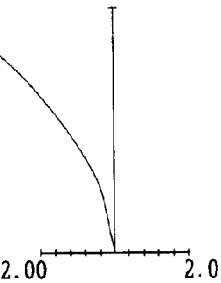
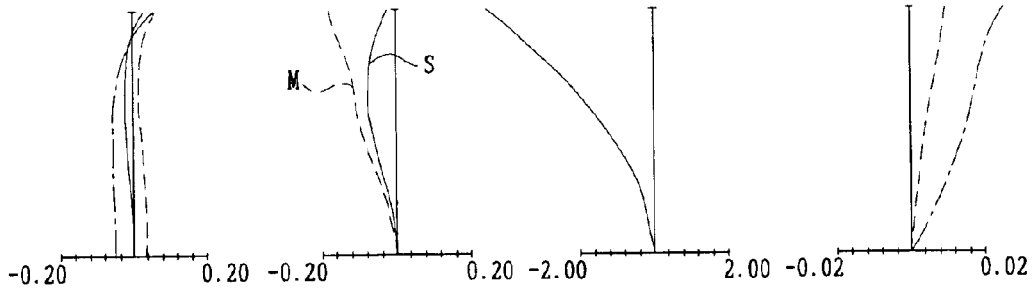
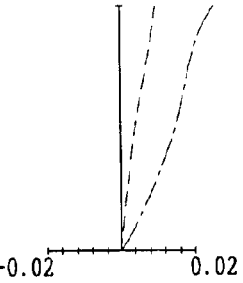
FIG.9E
FIG.9F
FIG.9G
FIG.9H
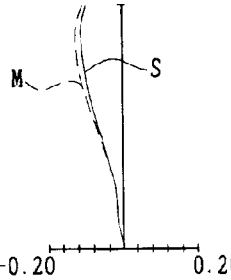
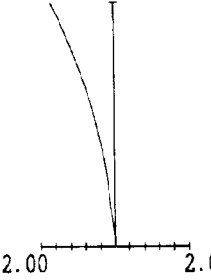
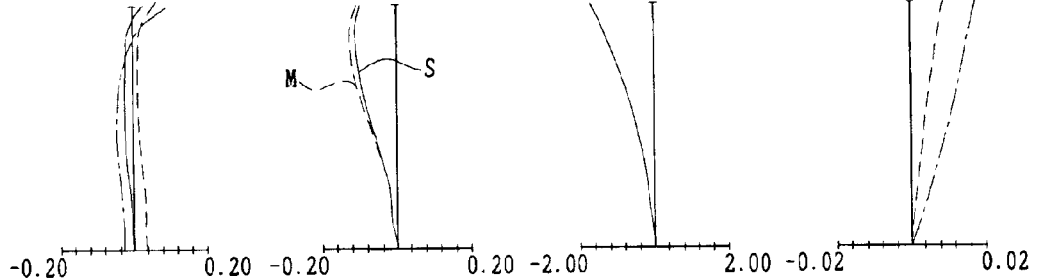
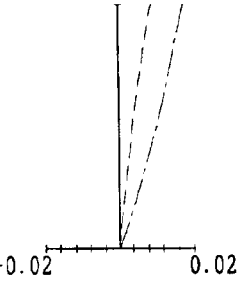
FIG.9I
FIG.9J
FIG.9K
FIG.9L
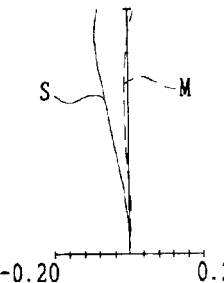
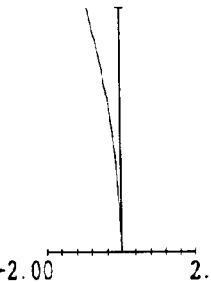
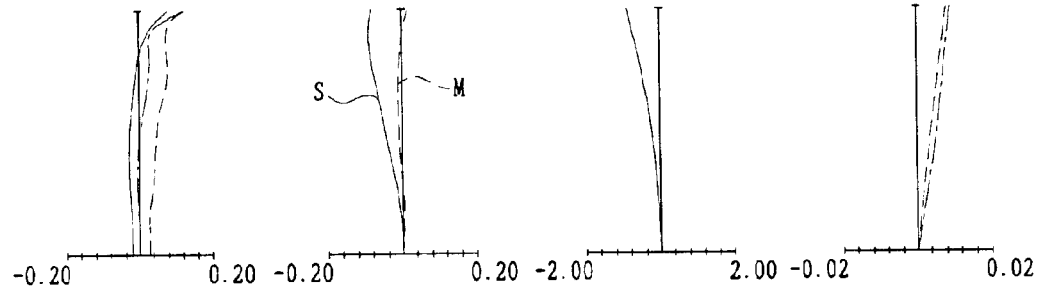
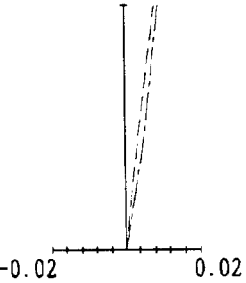
—·—·— 435.84
— — — 656.27
———— 587.56

SPHERICAL ABERRATION   ASTIGMATISM   DISTORTION   CHROMATIC ABERRATION OF MAGNIFICATION

—·—·— 435.84
— — — 656.27
———— 587.56

ZOOM LENS SYSTEM AND CAMERA USING THE SAME

This application claims priority to Japanese Patent Application No. 2003-296444 filed 20 Aug. 2003, and Japanese Application No. 2003-296446 filed 20 Aug. 2003, the contents of which are incorporated herein by reference in their entirety.

BACKGROUND OF THE INVENTION

1. Field of the Invention

The present invention relates to a zoom lens system and a camera using the zoom lens system and, in particular, a wide angle zoom lens system having high performance suitable for an electronic image pickup device particularly used for a single-lens reflex camera, and a camera using the zoom lens.

2. Description of the Related Art

Conventionally, although various types of zoom lenses are known, it has been demanded that in particular, constitution of the first lens group be properly arranged when generally making wide angle system, aiming at large-aperture or pursuing further high performance.

Conventionally, as a zoom lens which is generally easy to make wide angle system, a zoom lens type in which a negative lens group is arranged at a forward position has been known, for example, as shown in the Japanese unexamined patent application, Toku Kai Shou.60-130712, Toku Kai Shou. 62-200316 or Toku Kai Hei 10-82954.

The zoom lens described in Toku Kai Shou.60-130712 has in order from an object side a first lens group of negative refracting power and a second lens group of positive refracting power, wherein the first lens group is constituted of five lenses that are negative, negative, positive, negative and positive lens, and the minimum F number is about 3.6.

The zoom lens described in Toku Kai Shou. 62-200316 has in order from an object side a first lens group of negative refracting power and a second lens group of positive refracting power, wherein the first lens group consists of six lenses which are arranged in the order of negative, negative, positive, negative, positive and negative lens and the half angle of field at the wide angle end is about 37°.

The zoom lens described in Toku Kai Hei 10-82954 is constituted as a zoom lens having four lens group wherein the first lens group has six lenses which are arranged in the order of negative, negative, negative, positive, negative and positive lens, and the minimum F number is about 3.6.

SUMMARY OF THE INVENTION

The zoom lens system according to the present invention comprises, in order from an object side, a first lens group having negative refracting power and a second lens group having positive refracting power, wherein zooming is carried out at least by changing the distance between the groups, and the first lens group comprises six lenses which are, in order from the object side, a first lens which has meniscus form, negative refracting power and a concave surface toward an image side, a second lens which has meniscus form, negative refracting power and a concave surface toward the image side, a third lens which has negative refracting power and a concave surface toward the image side, a fourth lens which has positive refracting power and double convex surfaces, a fifth lens having negative refracting power and a sixth lens having positive refracting power.

The zoom lens system according to the present invention comprises, in order from an object side, a first lens group having negative refracting power and a second lens group having positive refracting power, wherein zooming is carried out at least by changing the distance between the groups, and the first lens group comprises six lenses which are, in order from the object side, a first lens having negative refracting power, a second lens having negative refracting power, a third lens having negative refracting power, a fourth lens having positive refracting power, a fifth lens having negative refracting power and a sixth lens having positive refracting power, and the following condition (1) is satisfied.

$$0.2 < d6/|f1G| < 0.5 \quad (1)$$

where d6 is an air space between the third lens and the fourth lens, and f1G is a focal length of the first lens group.

The zoom lens system according to the present invention comprises, in order from an object side, a first lens group having negative refracting power and a second lens group having positive refracting power, wherein zooming is carried out at least by changing the distance between the groups, and the first lens group comprises, in order from the object side, a first lens which has meniscus form, negative refracting power and a concave surface toward an image side, a second lens which has meniscus form, negative refracting power and a concave surface toward the image side, a third lens which has negative refracting power and a concave surface toward the image side, a fourth lens which has positive refracting power, a fifth lens which has negative refracting power, and a sixth lens which has positive refracting power and the condition (1) mentioned above is satisfied.

The zoom lens system according to the present invention comprises, in order from an object side, a first lens group having negative refracting power and a second lens group having positive refracting power, wherein zooming is carried out at least by changing the distance between the groups, and an aperture stop is arranged between the first lens group and the second lens group, and the second lens group comprises, in order from an object side, a first lens having positive refracting power and double convex surfaces, a second lens having positive or negative refracting power, a third lens having refracting power with a sign different from that of the second lens, a fourth lens having positive refracting power and double convex surfaces, a fifth lens having negative refracting power and a sixth lens having positive refracting power and double convex surfaces, and the following condition is satisfied.

$$0.07 < d12/f2G < 0.30$$

where d12 is an air space on an optical axis between the first lens and the second lens in the second lens group, and f2G is a focal length of the second lens group.

The camera according to the present invention uses the zoom lens system according to the present invention.

According to the present invention, it is possible to obtain a zoom lens system which easily suppresses a change of curvature of field that tends to occur in focusing when using a zoom lens system in which a lens group having negative refracting power is arranged in a forward position, and which easily to suppresses decrease of the light quantity at a circumferential portion.

Moreover, it is possible to provide such type of zoom lens system that enables to have a wide angle and bright F number.

These and other features and advantages of the present invention becomes apparent from the following detailed description of the preferred examples when taken in conjunction with the accompanying drawings.

BRIEF DESCRIPTION OF THE DRAWINGS

FIGS. 2A to 2D, 2E to 2H and 2I to 2L are aberration diagrams showing spherical aberration, astigmatism, distortion and chromatic aberration of magnification at the wide angle end, the middle position and the telephoto end respectively when focusing is performed at the infinite distance of the zoom lens system in the first example.

FIGS. 3A to 3D, 3E to 3H and 3I to 3L are aberration diagrams showing spherical aberration, astigmatism, distortion and chromatic aberration of magnification at the wide angle end, the middle position and the telephoto end respectively, when focusing of the zoom lens is carried out at 0.4 m of photographing distance of the zoom lens system in the first example.

FIGS. 5A to 5D, 5E to 5H and 5I to 5L are aberration diagrams showing spherical aberration, astigmatism, distortion and chromatic aberration of magnification at the wide angle end, the middle position and the telephoto end respectively of the zoom lens when focusing is performed at the infinite distance of the zoom lens system in the second example.

FIGS. 6A to 6D, 6E to 6H and 6I to 6L are aberration diagrams showing spherical aberration, astigmatism, distortion and chromatic aberration of magnification at the wide angle end, the middle position and the telephoto end respectively, when focusing of the zoom lens is carried out at 0.4 m of photographing distance of the zoom lens system in the second example.

FIGS. 8A to 8D, 8E to 8H and 8I to 8L are aberration diagrams showing spherical aberration, astigmatism, distortion and chromatic aberration of magnification at the wide angle end, the middle position and the telephoto end respectively, when focusing of the zoom lens system is carried out at the infinite distance of the zoom lens system in the third example.

FIGS. 9A to 9D, 9E to 9H and 9I to 9L are aberration diagrams showing spherical aberration, astigmatism, distortion and chromatic aberration of magnification at the wide angle end, the middle position and the telephoto end respectively, when focusing of the zoom lens system is carried out at 0.4 m of photographing distance of the zoom lens system in the third example.

DETAILED DESCRIPTION OF THE PREFERRED EMBODIMENTS

Figure 1A:
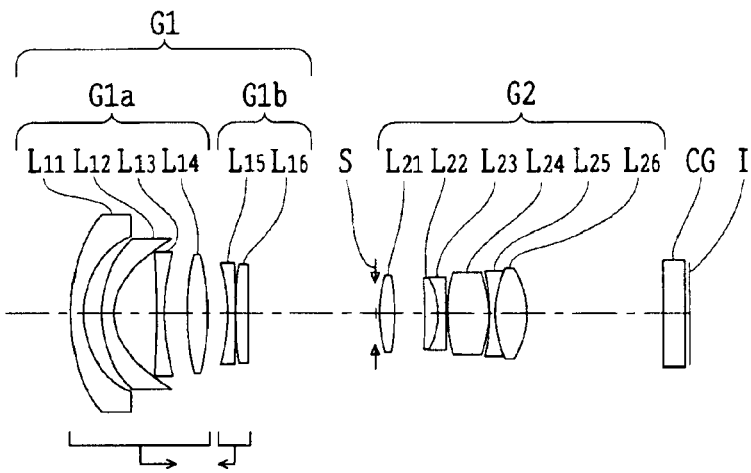
FIGS. 1A, 1B and 1C are sectional views showing an optical arrangement developed along the optical axis at the wide angle end, the middle position and the telephoto end respectively of the zoom lens system in a first example according to the present invention.

Prior to explaining examples, reasons why the constitution of the present invention has been made as well as function and advantages according to the present invention will be explained.

Each zoom lens system according to the present invention comprises, in order from an object side, a first lens group having negative refracting power and a second lens group having positive refracting power, wherein zooming is carried out at least by changing the distance between both groups, and the first lens group has six lenses which are negative, negative negative, positive, negative and positive lens in order from the object side.

In such constitution mentioned above, by arranging, in order from the object side, sequentially three negative lenses, each of which has a concave surface toward an image side, distortion aberration which increases acutely at the wide angle end can be corrected and it becomes advantageous in making wide angle of field.

Moreover, by combining a positive lens, a negative lens and a positive lens following the three negative lenses mentioned above, a zoom lens system which is easy to carry out well balanced correction of the aberration on the axis and the aberration off the axis can be obtained.

According to the constitution of the present invention, by arranging sequentially, in order from the object side, three negative lenses, each of which has a concave surface toward the image side, distortion aberration which increases acutely at the wide angle end can be corrected and it becomes advantageous in making the angle of field wide. In particular, if two lenses at the object side are composed of negative meniscus lenses, it becomes easy to suppress generation of the high-order aberration off the axis, such as coma aberration and the like. Then, it is also easy to correct the high-order aberration off the axis, such as coma berration generated in the first negative lens and the second negative lens through the third negative lens following these negative meniscus lenses. Moreover, if the fourth lens is formed in double convex form, it become easy to carry out correction of the aberration on the axis generated in the three negative lenses at the object side, and high performance of the first lens group can be achieved with six lenses.

Furthermore, it is desirable that a surface at the image side of the fifth negative lens is formed as a convex surface since the correction level of high-order aberration can be raised and it becomes easy to obtain a bright image having better imaging performance. It is desirable that an aperture stop is arranged at the image side of the first lens group, and furthermore, it is desirable to arrange the aperture stop at the object side of the second lens group.

In the zoom lens system of the present invention, it is desirable to satisfy the following condition (1).

$$0.2 < d6/|f1G| < 0.5 \quad (1)$$

If $d6/|f1G|$ is less than the lower limit of condition (1), change of the magnitude of the luminous flux in each surface of the third lens and the fourth lens decreases, and good correction of aberration from on the axis to the off axis becomes difficult.

On the other hand, when it exceeds the upper limit of condition (1), the total length of the first lens group becomes long and the outer diameter of the first lens tends to be large. Thereby, the lens system becomes in order to achieve large sizing of the aperture.

It is possible to constitute that like the zoom lens system of the present invention, the first lens is formed in meniscus form having a concave surface toward the image side, the second lens is formed in meniscus form having a concave surface toward the image side and the third lens is formed to have a concave surface toward the image side in order to make the angle of field wide easily, and to satisfy the condition (1) mentioned above.

In the present invention, it is good that the lower limit of condition (1) is set to 0.23 and it is much more desirable if it is set to 0.26. Moreover, in the present invention, it is good that the upper limit of condition (1) is set to 0.4 and it is much more desirable if it is set to 0.35. In this way, it becomes more advantageous by attaining both correction of aberration and shortening of the total length of the first lens group.

In the zoom lens system of the present invention, the second lens group comprises at least two sets of cemented lens having a positive lens and a negative lens or at least one positive single lens having double convex aspherical surfaces. If constituted in this way, it becomes more desirable with respect to the second lens group. The second lens group, by positive refracting power, has function which converges the light emanated by the first lens having negative refracting power. Therefore, if decentering exists in each lens element of the second lens group, asymmetrical coma aberration and asymmetrical astigmatism are generated and an imaging performance becomes easy to get worse. Then, if two or more cemented lenses having a positive lens and a negative lens are used, it becomes possible to reduce deterioration of the image owing to decentering caused by errors when incorporating each lens.

With respect to the order of distribution of refracting power of lenses in the cemented lens in the second lens group, any of the junction doublet having the order of positive, negative from the object side, the junction doublet having the order of negative, positive, the junction triplet having the order of positive, negative, positive or the junction triplet having the order of negative, positive, negative from the object side, can be adopted. A positive single lens may be composed to have an aspherical surface. If composed in this way, deterioration of the image by decentering can be easily reduced. Particularly, if a positive single lens is formed so as to have double aspherical surfaces, influence due to correction of decentering can be reduced much easily. Moreover, it is more desirable to compose such that the second lens comprises plural cemented lenses mentioned above and the positive lens comprises double aspherical surfaces, because it becomes easy to suppress the influence of decentering.

In the zoom lens system of the present invention, it is desirable to satisfy the following condition (2).

$$0.3 < |f1G|/GD1 < 0.7 \quad (2)$$

where GD1 is the total length of the first lens group, and f1G is the focal length of the first lens group.

If condition (2) is satisfied, change of the diameter of the luminous flux from the wide angle end to the telephoto end becomes proper, and good performance is easily obtained all over the range. If $|f1G|/GD1$ is less than the lower limit of condition (2), the total length of the first lens becomes long and in order to achieve large aperture, the outer diameter of the first lens must be enlarged. On the other hand, if it exceeds the upper limit of condition (2), it becomes difficult to secure the thickness of the lens and the thickness of the edge portion of the first lens group, and the distance between lenses on the axis or off the axis.

In the zoom lens system of the present invention, it is desirable that the lower limit of condition (2) is set to 0.4 and it is more desirable that it is set to 0.45. In the zoom lens system of the present invention, it is desirable that the upper limit of condition (2) is set to 0.6 and it is more desirable that it is set to 0.55. By the constitution in this way, better performance is easily obtained over the whole range from the wide angle end to the telephoto end.

In the zoom lens system of the present invention, it is desirable to satisfy the following condition (3).

$$0.3 < DS/|f1G| < 0.9 \quad (3)$$

where DS is the distance between the surface at the image side of the first lens group and the surface at the object side of the second lens group when the focal length of the entire system is −0.8 times of the focal length of the first lens group, and f1G is the focal length of the first lens group.

It is not desirable that $DS/|f1G|$ exceeds the upper limit of condition (3) because the entire system becomes too long and particularly the outer diameter of the first lens becomes large too much. It is not desirable that it is less than the lower limit of condition (3) because the magnification of the lens group after the second lens group to the first lens group at telephoto end becomes large too much and the burden for correction of aberration in the first lens group increases.

In the zoom lens system of the invention, it is desirable that the lower limit of condition (3) is set to 0.4 and it is more desirable that it is set to 0.5. Moreover, in the zoom lens system of the present invention, it is desirable that the upper limit of condition (3) is set to 0.8 and it is more desirable that it is set to 0.75. For example, it is desirable to satisfy the following condition (3').

$$0.5 < DS/|f1G| < 0.8 \quad (3')$$

Moreover, in the zoom lens system of the invention, it is more desirable to satisfy the following condition (4).

$$0.9 < ft/|f1G| < 1.3 \quad (4)$$

where ft is the focal length of the entire zoom lens system at telephoto end, and f1G is the focal length of the first lens group.

If condition (4) is satisfied, the magnification of the lens group after the second lens group to the first lens group at the telephoto end becomes about −1 time, and more concretely, it becomes within the range of −0.9 to −1.2 times, and by satisfying condition (3), a proper focal length of the first lens can be secured while keeping constitution required for correction of aberration. Therefore, it is advantageous to miniaturization of the diameter of the first lens at the wide angle end, and securing of a moderate magnification ratio.

In the zoom lens system of the invention, it is good that the lower limit of condition (4) is st 0.95, and it is more desirable that it is set to 1.01. Moreover, it is good that the maximum limit of condition (4) is st 1.2, and it is more desirable that it is set to 1.15.

In addition, in the zoom lens system of the invention, various constitutions can be adopted by combining two or more constitutions mentioned above respectively. Moreover, plural conditions mentioned above can be combined arbitrarily so as to be satisfied.

In a constitution like the zoom lens system according to the present invention, which has a first lens group with negative refracting power and a second lens group with positive refracting power, the second lens group has a function which converges, by the strong positive refracting power, the light diverged in the first lens group having negative refracting power. Particularly, in order to make the zoom lens system having a half angle of field at the wide angle end which is about 45°, it is necessary to strengthen the divergence function of the first lens group. On the other hand, when a zoom lens system is composed as a two-unit zoom lens system, the second lens group has also a function which acts to determine an exit pupil position.

In order to enable to obtain good imaging performance, a constitution which generates these actions or functions is desirable. That is, if it is composed as the present invention, the luminous flux on the axis diverged through the first lens group can be made to be converged luminous flux by the first lens of the second lens group located near an aperture stop, and thus the outer diameters of the subsequent lens groups can be kept from becoming large. In this way, it is effective to suppress generation of the high-order aberration in the subsequent group, and to reduce degradation of the image due to decentering to the whole. On the other hand, the principal point position of the entire second lens group can be arranged to the object side, and thus it becomes advantageous in case of enlarging the zoom ratio.

If the second lens to the sixth lens are arranged at a suitable distance so as to satisfy the following condition (5), an exit pupil can be placed in distant position and thus the angle of incidence of the off axial luminous flux to an imaging surface can be made approximate to perpendicular.

$$0.07 < d12/f2G < 0.30 \quad (5)$$

where d12 is the air space on the optical axis between the first lens and the second lens in the second lens group mentioned above, and f2G is the focal length of the second lens group.

If d12/f2G is less than the lower limit of condition (5), the position of the exit pupil becomes close, the incident angle of the luminous flux to an image surface inclines too much. Accordingly when an image pickup device is arranged, a possibility that problems, such as shortage of the light quantity of a circumferential portion and generation of shading may occur becomes large. On the other hand, if it exceeds the upper limit of condition (5), the total length of the second lens group becomes long, and the balance of the incident position of the luminous flux on the axis and that of the luminous flux off the axis to the second lens becomes worse, and thus it becomes difficult to exercise good performance.

The constitution of the present invention is desirable since the second lens group comprises: a front group having the first lens; and a rear group having the second lens and the subsequent lenses, where five lenses of the rear group can be considered as one in this constitution.

In the zoom lens system of the invention, if the arrangement of the refracting power of five or six lenses in the second lens group is arranged so as to be symmetrical, and a positive lens and a negative lens are almost nearly arranged alternately, it becomes easy to keep the balance of the whole aberration and is advantageous to correction of aberration. For example, in the zoom lens system of the invention, if the refracting power of the second lens to the sixth lens is arranged in the order of positive, negative positive, negative and positive so as to be symmetrical, particularly the performance of the off axial luminous flux can be secured. Moreover, chromatic aberration can be efficiently corrected by arranging a positive lens and a negative lens alternately.

In the zoom lens system of the invention, if the refracting power of the first lens to the third lens and that of the fourth lens to the sixth lens are arranged in the order of positive, negative and positive so as to be symmetrical, particularly the performance of the off axial luminous flux can be secured. In this case, also, chromatic aberration can be efficiently corrected by arranging a positive lens and a negative lens alternately.

In the zoom lens system of the present invention, it is good that the lower limit of condition (5) is set to 0.15. Moreover, it is good that the upper limit of condition (5) is set to 0.25, and it is more desirable that it is set to 0.17. Particularly when the order in arrangement of the second lens and the third lens is a positive lens and a negative lens, it is desirable to satisfy the following condition (5') since it becomes easier to keep the balance of various kinds of performance.

$$0.15 < d12/f2G < 0.25 \quad (5')$$

where d12 is the air space on the optical axis between the first lens and the second lens in the second lens group mentioned above, and f2G is the focal length of the second lens group.

When the order in arrangement of the second lens and the third lens is a negative lens and a positive lens, it is desirable that the following condition (5") is satisfied since it becomes easier to keep the balance of various kinds of performance.

$$0.07 < d12/f2G < 0.17 \quad (5'')$$

where d12 is the air space on the optical axis between the first lens and the second lens in the second lens group mentioned above, and f2G is the focal length of the second lens group.

Incidentally, if decentering exists in each lens element in the second lens group, asymmetrical coma aberration and astigmatism occur and an imaging performance deteriorates. In the zoom lens system of the invention, if the second lens and the third lens, as well as the fifth lens and the sixth lens, are composed of a cemented lens respectively, it becomes easy to reduce deterioration of the image owing to decentering caused by errors when incorporating each lens element.

In the zoom lens system of the invention, if the fourth lens is composed of a positive single lens, it becomes easier to secure the symmetry of the refracting power in the second lens group.

Furthermore, if at least one surface of this fourth lens is formed to be aspherical, deterioration of the image due to decentering can be reduced. Particularly, if both surfaces are made to be aspherical, the effect mentioned above increases further. That is, by aspherical surfaces, even if refracting power of the surface of the lens is weakened, sufficient correction of aberration becomes possible and a fluctuation of the optical axis due to decentering can be made small.

In the zoom lens system of the invention, it is desirable that the focal length of the first lens in the second lens group mentioned above satisfies the following condition (6).

$$0.5 < f1/f2G < 2.0 \qquad (6)$$

where f1 is the focal length of the first lens in the second lens group, and f2G is the focal length of the second lens group.

If f1/f2G is less than the lower limit of condition (6), it becomes difficult to obtain good imaging performance while satisfying condition (5) since the refracting power of the first lens becomes strong too much. On the other hand, if it exceeds the upper limit of condition (6), the refracting power of the first lens becomes weak too much, and the outer diameter subsequent to the second lens becomes easily large. Moreover, it becomes difficult to maintain the balance between the diameter of incidence of the luminous flux on the axis to the second lens and the incident position of the luminous flux off the axis.

It is good that the lower limit of condition (6) in the zoom lens system of the invention is set to 0.8. It is good that the upper limit of condition (6) is set to 1.5, and it is more desirable that it is set to 1.0. Particularly, it is better that the following condition (6') is satisfied when the order of the arrangement of the second lens and the third lens is a positive lens and a negative lens since it becomes easier to keep the balance of various kinds of performance.

$$0.8 < f1/f2G < 1.5 \qquad (6')$$

where f1 is the focal length of the first lens in the second lens group, and f2G is the focal length of the second lens group.

It is desirable that the following condition (6") is satisfied when the order of the arrangement of the second lens and the third lens is a negative lens and a positive lens since it becomes easier to keep the balance of various kinds of performance.

$$0.5 < f1/f2G < 1.0 \qquad (6'')$$

where f1 is the focal length of the first lens in the second lens group, and f2G is the focal length of the second lens group.

In the zoom lens system of the invention, it is desirable that the composite focal length of the second lens and the third lens in the second lens group satisfies the following condition (7).

$$-2.0 < f23/f2G < -0.4 \qquad (7)$$

where f23 is the composite focal length of the second lens and the third lens in the second lens group, and f2G is the focal length of the second lens group.

If f23/f2G is less than the lower limit of condition (7), it becomes difficult to secure an exit pupil position properly since positions of the principal point of the second lens to the sixth lens cannot be arranged sufficiently to the image side as the composite refracting power of the second lens and the third lens becomes weak too much. On the other hand, if it exceeds the upper limit of condition (7), the composite refracting power of the second lens and the third lens becomes strong too much and thus strengthening positive refracting power in other lenses is required, and securing of correction of aberration and the accuracy of lens surfaces become difficult. In addition, in the zoom lens system of the invention, it is good that the lower limit of condition (7) is set to −1.5, and it is much more desirable that it is set to −1. Moreover, it is good that the upper limit of condition (7) is set to −0.8.

Particularly, it is desirable that the following condition (7') is satisfied when the order of the arrangement of the second lens and the third lens is a positive lens and a negative lens, since it becomes easier to keep the balance of various kinds performance.

$$-1.5 < f23/f2G < -0.8 \qquad (7')$$

where f23 is the composite focal length of the second lens and the third lens in the second lens group, and f2G is the focal length of the second lens group.

It is desirable that the following condition (7") is satisfied when the order of the arrangement of the second lens and the third lens is a negative lens and a positive lens since it becomes easier to keep the balance of various kinds of performance.

$$-1.0 < f23/f2G < -0.4 \qquad (7'')$$

where f23 is the composite focal length of the second lens and the third lens in the second lens group, and f2G is the focal length of the second lens group.

In the zoom lens system of the invention, it is desirable that the focal length of the fourth lens in the second lens group satisfies the following condition (8).

$$0.4 < f4/f2G < 1.5 \qquad (8)$$

where f4 is the focal length of the fourth lens in the second lens group, and f2G is the focal length of the second lens group.

If f4/f2G is less than the lower limit of condition (8), the refracting power of the fourth lens becomes strong too much, and it becomes difficult to suppress the image degradation due to decentering. On the other hand, if it exceeds the upper limit of condition (8), the refracting power of the fourth lens becomes weak too much, and it becomes difficult to secure an exit pupil position properly. In the zoom lens system of the invention, it is good that the lower limit of condition (8) is set to 0.5. Furthermore, it is good that the upper limit of condition (8) is set to 1.0. Particularly, it is desirable that the following condition (8') is satisfied since it becomes easier to keep the balance of various kinds of performance.

$$0.5 < f4/f2G < 1.0 \qquad (8')$$

where f4 is the focal length of the fourth lens in the second lens group, and f2G is the focal length of the second lens group.

In the zoom lens system of the invention, it is desirable that the composite focal length of the fifth lens and the sixth lens in the second lens group satisfies the following condition (9).

$$-0.5 < f2G/f56 < 0.1 \qquad (9)$$

where f2G is the focal length of the second lens group, f56 is the composite focal length of the fifth lens and the sixth lens in the second lens group.

If f2G/f56 is less than the lower limit of condition (9), the composite refracting power of the fifth lens and the sixth lens becomes strong too much to negative side, the position of the principal point of the second lens to the sixth lens cannot be arranged sufficiently to the image side, and accordingly, it becomes difficult to secure the exit pupil position properly. On the other hand, if it exceeds the upper limit of condition (9), the composite refracting power of the fifth lens and the sixth lens becomes strong too much to positive side, and the outer diameters of these lenses become large too much. Moreover, the correction of aberration effect in the fifth negative lens becomes small.

In addition, in the zoom lens system of the invention, it is good that the lower limit of condition (9) is set to −0.1. Moreover, it is good that the upper limit of condition (9) is set to 0.05, and it is more desirable that it is set to 0. Particularly, it is desirable that the following condition (9') is satisfied when the order of the arrangement of the second lens and the third lens is a positive lens and a negative lens since it becomes easier to keep the balance of various kinds of performance.

$$-0.1 < f2G/f56 < 0.05 \qquad (9')$$

where f2G is the focal length of the second lens group, and f56 is the composite focal length of the fifth lens and the sixth lens in the second lens group.

It is desirable that the following condition (9") is satisfied when the order of the arrangement of the second lens and the third lens is a negative lens and a positive lens since it becomes easier to keep the balance of various kinds of performance.

$$-0.5 < f2G/f56 < 0 \qquad (9'')$$

where f2G is the focal length of the second lens group, and f56 is the composite focal length of the fifth lens and the sixth lens in the second lens group.

In the zoom lens system of the invention, it is desirable that the second lens to the sixth lens in the second lens group satisfy the following condition (10).

$$0.8 < GD26/SD26 < 1 \qquad (10)$$

where GD26 is the total thickness on the optical axis of the first, second, third, fourth, fifth and sixth lenses in the second lens group, and SD26 is the length on the optical axis from the surface at the object side of the second lens to the surface at the image side of the sixth lens in the second lens group.

If GD26/SD26 is less than the lower limit of condition (10), the total thickness of the second lens to the sixth lens of the second lens group decreases, and astigmatic correction becomes difficult. On the other hand, if it exceeds the upper limit of condition (10) where it becomes 1, all lenses of the second lens to the sixth lens become to be cemented on the optical axis, and accordingly securing of a space required for holding the lenses becomes difficult.

In the zoom lens system of the invention, if the lower limit of condition (10) is set to 0.9, astigmatism can be more reduced. That is, it is desirable to satisfy the following condition (10').

$$0.9 < GD26/SD26 < 1 \qquad (10')$$

where GD26 is the total thickness on the optical axis of the first, second, third, fourth, fifth and sixth lenses in the second lens group, and SD26 is the length on the optical axis from the surface at the object side of the second lens to the surface at the image side of the sixth lens in the second lens group.

In the zoom lens system of the invention, it is desirable that the second lens to the sixth lens in the second lens group satisfy the following condition (11).

$$0.4 < SD26/f2G < 1 \qquad (11)$$

where SD26 is the length on the optical axis from the surface at the object side of the second lens to the surface at the image side of the sixth lens in the second lens group, and f2G is the focal length of the second lens group.

If SD26/f2G is less than the lower limit of condition (11), the distance from the surface at the object side of the second lens to the surface at the image side of the sixth lens becomes short, and correction of aberration becomes difficult. On the other hand, if it exceeds the upper limit of condition (11), it becomes difficult to satisfy the condition (5) and to keep a required back focus.

In the zoom lens system of the invention, it is good that the lower limit of condition (11) is set to 0.5. Moreover, it is good that the upper limit of condition (11) is set to 0.9. Particularly, it is desirable that the following condition (11') is satisfied since it becomes easier to keep the balance of various kinds of performance.

$$0.5 < SD26/f2G < 0.9 \qquad (11')$$

where SD26 is the length on the optical axis from the surface at the object side of the second lens to the surface at the image side of the sixth lens in the second lens group, and f2G is the focal length of the second lens group.

In the zoom lens system of the invention, it is desirable that the distance between the surface at the image side of the first lens group and the surface at the object side of the second lens group satisfies the following condition (12).

$$1 < |f1G|/DS < 3 \qquad (12)$$

where f1G is the focal length of the first lens group, and DS is the distance between the surface at the image side of the first lens group and the surface at the object side of the second lens group when the focal length of the entire system is −0.8 times of the focal length of the first lens group.

If |f1G|/DS exceeds the upper limit of condition (12), the magnification subsequent to the second lens group to the first lens group at the telephoto end becomes large too much, and the burden of the correction of aberration in the first lens group becomes heavy and the number of lenses tends to increase too much. On the other hand, if it is less than the lower limit of condition (12), the entire zoom lens as a whole system becomes long, and particularly the outer diameter of the first lens tends to be large.

More preferably, in the zoom lens system of the invention, it is desirable that the magnification subsequent to the second lens group is about −1, more specifically, −0.9 times to −1.2 times at the telephoto end. If it is composed in this way, it becomes easy to secure a proper focal length of the first lens group by satisfying the condition (8), while securing a constitution required for correction of aberration.

In the zoom lens system of the invention, it is good that the lower limit of condition (12) is set to 1.2. Moreover, it is good that the upper limit of condition (12) is set to 2. Particularly, it is more desirable that it is set in a range of 1.2<|f1G|/DS<2.

In the zoom lens system of the invention, it is more desirable that the first lens group comprises, in order from the object side, two or more negative lenses, each having a concave surface directed toward the image side, a positive lens, a negative lens and a positive lens. In such constitution, by arranging two or more negative lenses, each having a concave surface toward the image side, in order from the object side, distortion aberration which increases sharply at the wide angle end can be corrected and it becomes advantageous to making the angle of field wide. And by combining a positive lens, a negative lens and a positive lens which are arranged subsequent to these negative lenses, the zoom lens which keeps the balance of the aberration on the axis and the aberration off the axis and which is easy to carry out correction can be obtained.

Furthermore, in the zoom lens system of the invention, it becomes easy to suppress generation of the high-order aberration off the axis, such as coma aberration and the like, by using negative meniscus lenses for two lenses at the object side. Further, if a negative lens is arranged as the third lens following them, it becomes easy to correct the off axial aberration in high-order, such as coma aberration generated in the second negative lens. Furthermore, desirably, in the zoom lens system of the invention, if a positive lens arranged to follow two or more negative lenses is formed as double convex shape, it becomes easy to carry out correction of the aberration on the axis generated in two or more negative lenses at the object side. It is more desirable that a convex surface is formed at the image side of the negative lens arranged to follow the positive lens since the correction level of high-order aberration can be raised and it becomes much easier to obtain a bright and good quality of imaging performance.

In the zoom lens system of the invention, it is desirable that imaging is carried out in a range of 90° or more with respect to the total angle of field (2ω) at the wide angle end. The zoom lens system of the invention has a constitution of lens group which is easy to make the angle of field wide. Therefore, it is desirable to use a zoom lens system of a wide angle of field that has 90° or more of an angle of field at the wide angle end. In the zoom lens system of the invention, an imaging can be made in a range where the total angle of field is 93° or more.

In addition, in the zoom lens system of the invention, various constitutions can be adopted by combining two or more constitutions mentioned above respectively. Moreover, plural conditions mentioned above can be combined arbitrarily to be satisfied.

In the zoom lens system of the invention, it is desirable that the lens groups which move at zooming operation are only two, that is, a two-unit zoom lens system. According to this constitution, a moving mechanism required in zooming operation can be simplified.

Moreover, in the zoom lens system of the invention, various constitutions can be adopted by combining two or more constitutions mentioned above respectively. Furthermore, plural conditions mentioned above can be combined arbitrarily to be satisfied.

The upper limit or lower limit in each condition can be limited respectively. Besides, values corresponding to conditions in the examples which are explained hereafter can be used as the upper limit or lower limit value.

Hereafter, the examples of the present invention are explained using drawings.

FIRST EXAMPLE

Figure 1B:
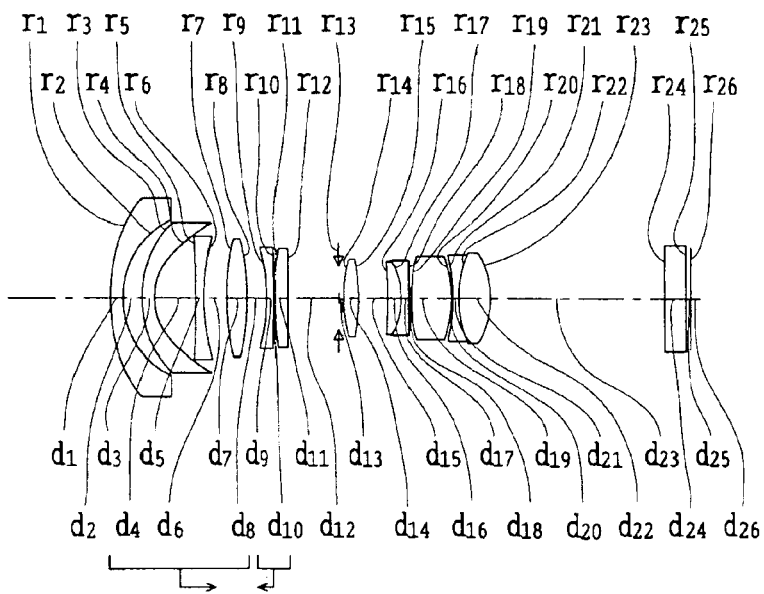
Figure 1C:
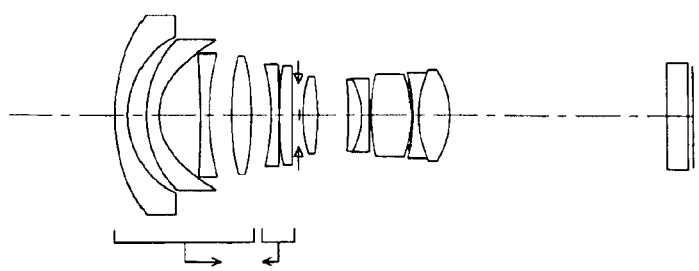

FIGS. 1A, 1B and 1C are sectional views showing an optical arrangement developed along the optical axis at the wide angle end, the middle position and the telephoto end respectively of the zoom lens in the first example according to the present invention. FIGS. 2A to 2D, 2E to 2H and 2I to 2L are aberration diagrams showing spherical aberration, astigmatism, distortion and chromatic aberration of magnification at the wide angle end, the middle position and the telephoto end respectively of the zoom lens system in the first example when focusing of the zoom lens system is carried out at the infinite distance. FIGS. 3A to 3D, 3E to 3H and 3I to 3L are aberration diagrams showing spherical aberration, astigmatism, distortion and chromatic aberration of magnification at the wide angle end, the middle position and the telephoto end respectively of the zoom lens system in the first example when focusing of the zoom lens is carried out at 0.4 m of photographing distance of the zoom lens in the first example.

In zoom lens system of the first example, in order from an object side, a first lens group G1, an aperture stop S and a second lens group G2 are arranged.

In FIG. 1A, the reference symbol CG represents a low pass filter, a near-infrared light cut filter and a CCD cover glass by replacing them with an equivalent optical element in form of a parallel flat plate. The reference symbol I shows an imaging surface.

The first lens group G1 comprises, in order from the object side, a negative meniscus lens L11 having a concave surface toward an image side, a negative meniscus lens L12 having a concave surface toward an image side, a double concave lens L13, a double convex lens L14, a negative meniscus lens L15 having a concave surface directed toward the object side, and a positive meniscus lens L16 having a convex surface directed toward the object side. The first lens group G1 has negative refracting power as a whole.

The second lens group G2 comprises, in order from the object side, a double convex lens L21, a cemented lens having a positive meniscus lens L22 with a concave surface directed toward the object side and a double concave lens L23, a double convex lens L24 and a cemented lens having a double concave lens 25 and a double convex lens L26. The second lens group G2 has positive refracting power as a whole.

When zooming is carried out from the wide angle end to the telephoto end, the first lens group G1 moves to the image side so as to make a locus of convex form toward the image side near the telephoto end, and the second lens group G2 moves to the object side together with the aperture stop S.

Focusing from the infinite distance to very close range in one of the zooming states from the wide angle end to the telephoto end is carried out by moving the front group G1a of the first lens group G1 toward the image side and moving the rear group G1b of the first lens group G1 toward the object side.

In focusing, other methods of moving, such as moving the whole first lens group G1 integrally, or moving only the rear group G1b, can be used.

Aspherical surfaces are formed on a surface at the image side of the negative meniscus lens L12 having a concave surface directed toward the image side and on both surfaces of the double convex lens L24.

Next, numerical data of optical elements composing the zoom lens system of the first example are shown.

In the numerical data, $r_1, r_2, \ldots$ denote radii of curvature of individual lens surfaces; $d_1, d_2, \ldots$ denote thickness of individual lenses or air space between them; $n_{d1}, n_{d2}, \ldots$ denote refractive indices of individual lenses at the d line; $v_{d1}, v_{d2}, \ldots$ denote Abbe's numbers of individual lenses; Fno. denotes an F number; f denotes the total focal length of the zoom lens system, and 2ω denotes the total angle of field.

When z is taken as the coordinate in the direction of the optical axis, y is taken as the coordinate orthogonal to the optical axis, K represents a conic constant, and $A_4, A_6, A_8, A_{10}$ represent aspherical coefficients, the configuration of each of the aspherical surfaces is expressed by the following equation.

$$Z=(y^2/r)/[1+\{1-(1+K)(y/r)^2\}^{1/2}]+A_4y^4+A_6y^6+A_8y^8+A_{10}y^{10}$$

These symbols are commonly used in the examples to be described later.

Numerical data 1

|  | wide angle end | middle position | telephoto end |
|---|---|---|---|
| f | 11.21 | 16.10 | 21.57 |
| Fno. | 2.85 | 3.16 | 3.53 |
| 2ω | 93.8° | 72.2° | 56.9° |
| $r_1 = 39.5894$ | $d_1 = 2.7500$ | $n_{d1} = 1.77250$ | $v_{d1} = 49.60$ |
| $r_2 = 19.2336$ | $d_2 = 4.1319$ | | |
| $r_3 = 23.4925$ | $d_3 = 2.900$ | $n_{d3} = 1.80610$ | $v_{d3} = 40.92$ |
| $r_4 = 12.5636$ | $d_4 = 9.3097$ | | |
| (aspherical surface) | | | |
| $r_5 = -298.3827$ | $d_5 = 1.8000$ | $n_{d5} = 1.80440$ | $v_{d5} = 39.59$ |
| $r_6 = 43.4758$ | $d_6 = 5.3592$ | | |
| $r_7 = 57.7472$ | $d_7 = 4.3200$ | $n_{d7} = 1.75520$ | $v_{d7} = 27.51$ |
| $r_8 = -57.7472$ | $d_8 = D8$ | | |
| $r_9 = -43.5463$ | $d_9 = 1.7000$ | $n_{d9} = 1.88300$ | $v_{d9} = 40.76$ |
| $r_{10} = -625.1817$ | $d_{10} = 0.1000$ | | |
| $r_{11} = 70.6025$ | $d_{11} = 2.8000$ | $n_{d11} = 1.78472$ | $v_{d11} = 25.68$ |
| $r_{12} = 250.1754$ | $d_{12} = D12$ | | |
| $r_{13} =$ | $d_{13} = 1.0000$ | | |
| (aperture stop) | | | |
| $r_{14} = 28.5691$ | $d_{14} = 3.4441$ | $n_{d14} = 1.57099$ | $v_{d14} = 50.80$ |
| $r_{15} = -62.3093$ | $d_{15} = 6.7403$ | | |
| $r_{16} = -108.7751$ | $d_{16} = 3.1918$ | $n_{d16} = 1.48749$ | $v_{d16} = 70.23$ |
| $r_{17} = -16.8629$ | $d_{17} = 1.6600$ | $n_{d17} = 1.83481$ | $v_{d17} = 42.72$ |
| $r_{18} = 419.5895$ | $d_{18} = 0.4519$ | | |
| $r_{19} = 31.3057$ | $d_{19} = 9.2900$ | $n_{d19} = 1.58313$ | $v_{d19} = 59.38$ |
| (aspherical surface) | | | |
| $r_{20} = -25.4261$ | $d_{20} = 0.2606$ | | |
| (aspherical surface) | | | |
| $r_{21} = -43.7765$ | $d_{21} = 1.3700$ | $n_{d21} = 1.80440$ | $v_{d21} = 39.59$ |
| $r_{22} = 24.0803$ | $d_{22} = 7.2430$ | $n_{d22} = 1.48749$ | $v_{d22} = 70.23$ |
| $r_{23} = -18.7623$ | $d_{23} = D23$ | | |
| $r_{24} = \infty$ | $d_{24} = 4.6500$ | $n_{d24} = 1.51633$ | $v_{d24} = 64.14$ |
| $r_{25} = \infty$ | $d_{25} = 1.0000$ | | |
| $r_{26} = \infty$ | $d_{26} = 0$ | | |
| (image surface) | | | | aspherical data the fourth surface $K = -1.1929$
$A_4 = 3.5604 \times 10^{-5}$   $A_6 = -8.7009 \times 10^{-10}$   $A_8 = 2.2597 \times 10^{-10}$
$A_{10} = -8.9735 \times 10^{-13}$ the nineteenth surface $K = -2.5703$
$A_4 = -1.6964 \times 10^{-7}$   $A_6 = 2.9944 \times 10^{-8}$   $A_8 = 3.6253 \times 10^{-10}$
$A_{10} = -3.2098 \times 10^{-12}$ the twentieth surface $K = -1.1772$
$A_4 = 2.7778 \times 10^{-5}$   $A_6 = 1.6530 \times 10^{-8}$   $A_8 = -1.3383 \times 10^{-10}$
$A_{10} = 0$ zoom data

| surface distance | wide angle end | middle position | telephoto end |
|---|---|---|---|
| (when focusing at infinite-distance object point) | | | |
| D8 | 4.80120 | 4.80120 | 4.80120 |
| D12 | 29.52601 | 11.92308 | 1.70262 |
| D23 | 30.74933 | 39.35719 | 48.97985 |
| (when foccusing at object point of 0.4 m) | | | |
| D8 | 2.63974 | 2.70750 | 2.71188 |
| D12 | 31.49134 | 13.82644 | 3.60201 |

SECOND EXAMPLE

Figure 4A:
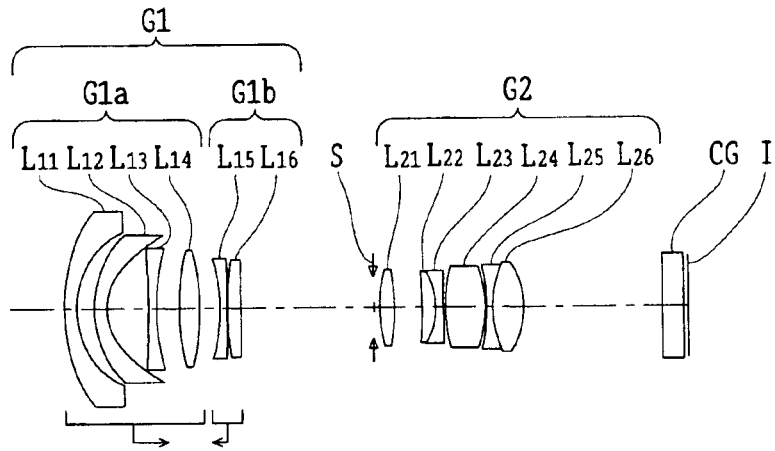
FIGS. 4A, 4B and 4C are sectional views showing an optical arrangement developed along the optical axis at the wide angle end, the middle position and the telephoto end respectively of the zoom lens system in a second example.
Figure 4B:
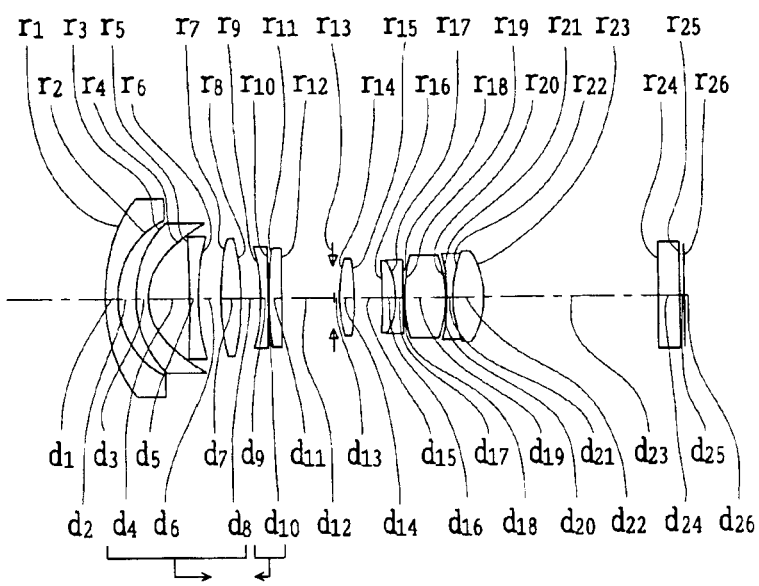
Figure 4C:
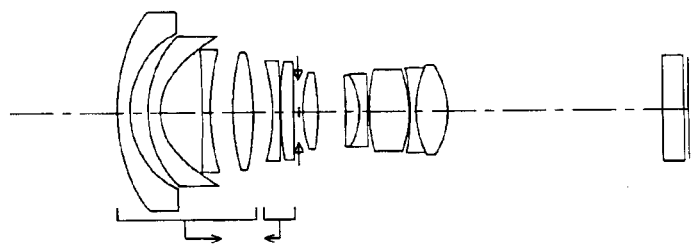

FIGS. 4A, 4B and 4C are sectional views showing an optical arrangement developed along the optical axis at the wide angle end, the middle position and the telephoto end respectively of the zoom lens system in the second example according to the present invention. FIGS. 5A to 5D, 5E to 5H and 5I to 5L are aberration diagrams showing spherical aberration, astigmatism, distortion and chromatic aberration of magnification at the wide angle end, the middle position and the telephoto end respectively focusing at the infinite distance of the zoom lens in the second example. FIGS. 6A to 6D, 6E to 6H and 6I to 6L are aberration diagrams showing spherical aberration, astigmatism, distortion and chromatic aberration of magnification at the wide angle end, the middle position and the telephoto end respectively of the zoom lens system in the second example when focusing of the zoom lens system is carried out at 0.4 m of photographing distance.

In the zoom lens of the second example, in order from an object side, a first lens group G1, an aperture stop S and a second lens group G2 are arranged.

In FIG. 4A, the reference symbol CG represents a low pass filter, a near-infrared light cut filter and a CCD cover glass by replacing them with an equivalent optical element in form of a parallel flat plate. The reference symbol I shows an imaging surface.

The first lens group G1 comprises, in order from the object side, a negative meniscus lens L11 having a concave surface directed toward an image side, a negative meniscus lens L12 having a concave surface directed toward the image side, a double concave lens L13, a double convex lens L14, a negative meniscus lens L15 having a concave surface directed toward the object side, and a positive meniscus lens L16 having a convex surface directed toward the object side. The first lens group G1 has negative refracting power as a whole.

The second lens group G2 comprises, in order from the object side, a double convex lens L21, a cemented lens having a positive meniscus lens L22 having a concave surface directed toward the object side and a double concave lens L23, a double convex lens L24, and a cemented lens having a double concave lens L25 and a double convex lens L26. The second lens group G2 has positive refracting power as a whole.

When zooming is carried out from the wide angle end to the telephoto end, the first lens group G1 moves to the image side so as to make a locus of convex form toward the image side near the telephoto end, and the second lens group G2 moves to the object side together with the aperture stop S.

Focusing from the infinite distance to very close range in one of the zooming states from the wide angle end to the telephoto end of zoom is carried out by moving the front group G1a of the first lens group G1 toward the image side and moving the rear group G1b toward the object side. In focusing, other methods of moving, such as moving the whole first lens group G1 integrally, or moving only the rear group G1b, can be used.

Aspherical surfaces are formed on a surface at the image side of the negative meniscus lens L12 having a concave surface directed toward the image side and on both surfaces of the double convex lens L24.

Next, numerical data of optical elements composing the zoom lens system of the second example are shown.

Numerical data 2

| surface distance | wide angle end | middle position | telephoto end |
|---|---|---|---|
| f | 11.28 | 16.10 | 21.58 |
| Fno. | 2.85 | 3.14 | 3.48 |
| 2ω | 93.8° | 72.2° | 56.8° |

| | | | |
|---|---|---|---|
| $r_1 = 37.9971$ | $d_1 = 2.7000$ | $n_{d1} = 1.77250$ | $v_{d1} = 49.60$ |
| $r_2 = 19.8432$ | $d_2 = 3.9342$ | | |
| $r_3 = 23.5755$ | $d_3 = 2.9000$ | $n_{d3} = 1.80610$ | $v_{d3} = 40.92$ |
| $r_4 = 12.7136$ | $d_4 = 9.2523$ | | |
| (aspherical surface) | | | |
| $r_5 = -187.9502$ | $d_5 = 1.6500$ | $n_{d5} = 1.80440$ | $v_{d5} = 39.59$ |
| $r_6 = 35.7083$ | $d_6 = 5.8602$ | | |
| $r_7 = 49.4731$ | $d_7 = 4.1297$ | $n_{d7} = 1.74077$ | $v_{d7} = 27.79$ |
| $r_8 = -70.4280$ | $d_8 = D8$ | | |
| $r_9 = -54.6099$ | $d_9 = 1.6000$ | $n_{d9} = 1.88300$ | $v_{d9} = 40.76$ |
| $r_{10} = -278.9770$ | $d_{10} = 0.0838$ | | |
| $r_{11} = 95.8088$ | $d_{11} = 2.9377$ | $n_{d11} = 1.78472$ | $v_{d11} = 25.68$ |
| $r_{12} = 346.5293$ | $d_{12} = D12$ | | |
| $r_{13} =$ | $d_{13} = 1.0000$ | | |
| (aperture stop) | | | |
| $r_{14} = 25.3573$ | $d_{14} = 3.6315$ | $n_{d14} = 1.53172$ | $v_{d14} = 48.84$ |
| $r_{15} = -52.9963$ | $d_{15} = 6.4475$ | | |
| $r_{16} = -61.0441$ | $d_{16} = 3.1275$ | $n_{d16} = 1.48749$ | $v_{d16} = 70.23$ |
| $r_{17} = -15.8985$ | $d_{17} = 1.6782$ | $n_{d17} = 1.83481$ | $v_{d17} = 42.72$ |
| $r_{18} = 305.9730$ | $d_{18} = 0.3071$ | | |
| $r_{19} = 32.1687$ | $d_{19} = 9.4367$ | $n_{d19} = 1.58913$ | $v_{d19} = 61.14$ |
| (aspherical surface) | | | |
| $r_{20} = -23.3127$ | $d_{20} = 0.2016$ | | |
| (aspherical surface) | | | |
| $r_{21} = -43.2385$ | $d_{21} = 1.3987$ | $n_{d21} = 1.80440$ | $v_{d21} = 39.59$ |
| $r_{22} = 24.1298$ | $d_{22} = 7.9524$ | $n_{d22} = 1.48749$ | $v_{d22} = 70.23$ |
| $r_{23} = -18.5139$ | $d_{23} = D23$ | | |
| $r_{24} = \infty$ | $d_{24} = 4.6500$ | $n_{d24} = 1.51633$ | $v_{d24} = 64.14$ |
| $r_{25} = \infty$ | $d_{25} = 1.0000$ | | |
| $r_{26} = \infty$ | $d_{26} = 0$ | | |
| (image surface) | | | | aspherical data the fourth surface $K = -1.0594$
$A_4 = 2.7803 \times 10^{-5}$   $A_6 = 2.6653 \times 10^{-8}$   $A_8 = 1.2883 \times 10^{-10}$
$A_{10} = -4.5315 \times 10^{-13}$ the nineteenth surface $K = -3.9272$
$A_4 = 1.9632 \times 10^{-7}$   $A_6 = -1.6423 \times 10^{-9}$   $A_8 = 6.5837 \times 10^{-10}$
$A_{10} = -4.6274 \times 10^{-12}$ the twentieth surface $K = -1.4876$
$A_4 = 2.3962 \times 10^{-5}$   $A_6 = 3.2194 \times 10^{-10}$   $A_8 = -6.9462 \times 10^{-11}$
$A_{10} = 0$ zoom data

| surface distance | wide angle end | middle position | telephoto end |
|---|---|---|---|
| (when focusing at infinite-distance object point) | | | |
| D8 | 4.90179 | 4.90179 | 4.90179 |
| D12 | 31.08093 | 12.31967 | 1.16140 |
| D23 | 31.17858 | 39.41545 | 48.78522 |
| (when focussing at object point of 0.4 m) | | | |
| D8 | 1.32166 | 1.45662 | 1.47855 |
| D12 | 34.27747 | 15.39571 | 4.21786 |

THIRD EXAMPLE

Figure 7A:
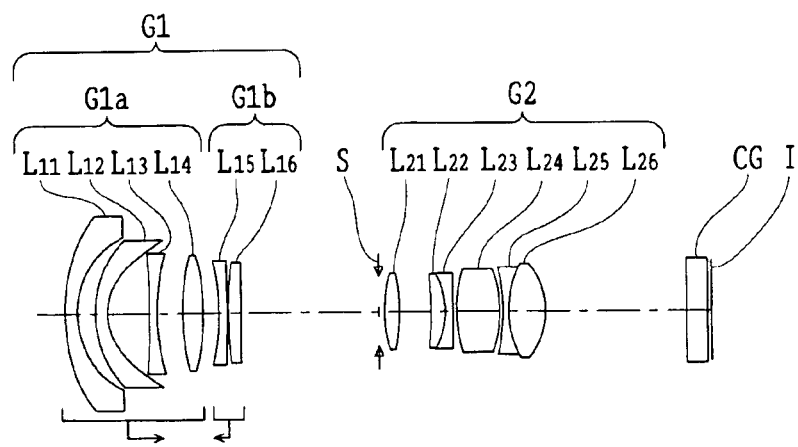
FIGS. 7A, 7B and 7C are sectional views showing an optical arrangement developed along the optical axis at the wide angle end, the middle position and the telephoto end respectively of the zoom lens system in a third example.
Figure 7B:
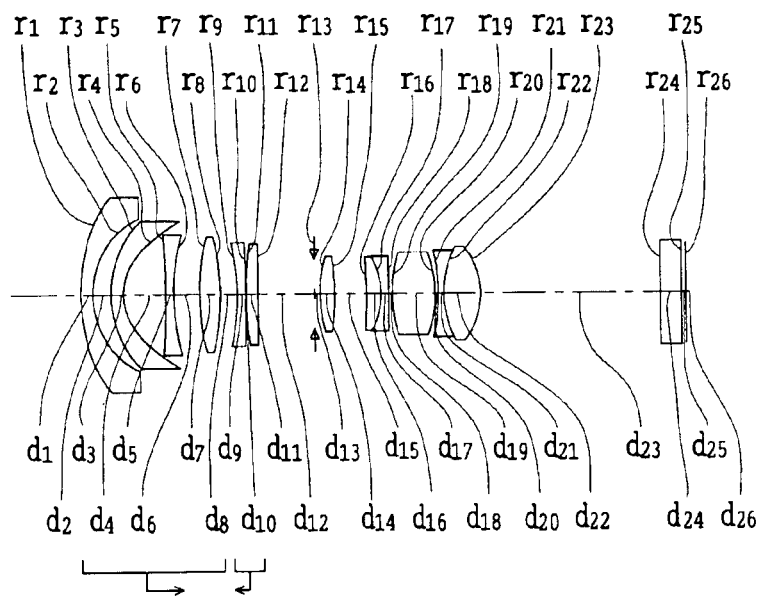
Figure 7C:
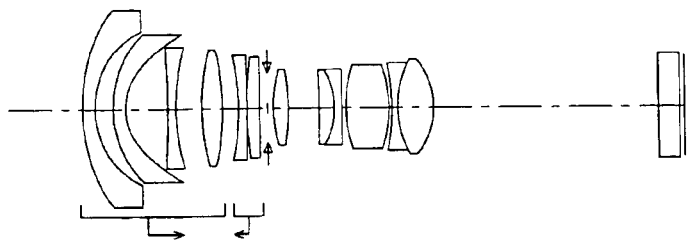

FIGS. 7A, 7B and 7C are sectional views showing an optical arrangement developed along the optical axis at the wide angle end, the middle position and the telephoto end respectively of the zoom lens system in the third example. FIGS. 8A to 8D, 8E to 8L and 8I to 8L are aberration diagrams showing spherical aberration, astigmatism, distortion and chromatic aberration of magnification at the wide angle end, the middle position and the telephoto end respectively, when focusing of the zoom lens is carried out at the infinite distance of the zoom lens system in the third example. FIGS. 9A to 9D, 9E to 9H and 9I to 9L are aberration diagrams showing spherical aberration, astigmatism, distortion and chromatic aberration of magnification at the wide angle end, the middle position and the telephoto end respectively, when focusing of the zoom lens is carried out at 0.4 m of photographing distance, in the third example of an image forming optical system according to the present invention.

In the zoom lens system of the third example, in order from an object side, a first lens group G1, an aperture stop S and a second lens group G2 are arranged.

In FIG. 7A, the reference symbol CG represents a low pass filter, a near-infrared light cut filter and a CCD cover glass by replacing them with an equivalent optical element in form of a parallel flat plate. The reference symbol I shows an imaging surface.

The first lens group G1 comprises, in order from the object side, a negative meniscus lens L11 having a concave surface toward the image side, a negative meniscus lens L12 having a concave surface toward the image side, a double concave lens L13, a double convex lens L14, a negative meniscus lens L15 having a concave surface directed toward the object side, and a positive meniscus lens L16 having a convex surface directed toward the object side. The first lens group G1 has negative refracting power, as a whole.

The second lens group G2 comprises, in order from the object side, a double convex lens L21, a cemented lens having a positive meniscus lens L22 with a concave surface directed toward the object side and a double concave lens L23, a double convex lens L24, and a cemented lens having a double concave lens L25 and a double convex lens L26. The second lens group G2 has positive refracting power as a whole.

When zooming is carried out from the wide angle end to the telephoto end, the first lens group G1 moves to the image side so as to make a locus of convex form toward the image side near the telephoto end, and the second lens group G2 moves together with the aperture stop S to the object side. Focusing from the infinite distance to very close range in one of the zooming states from the wide angle end to the telephoto end of zoom is carried out by moving the front group G1a of the first lens group G1 toward the image side and moving the rear group G1b of the first lens group G1 toward the object side.

In focusing, other methods of moving, such as moving the whole first lens group G1 integrally or moving only the rear group G1b, can be used.

Aspherical surfaces are formed on a surface at the image side of the negative meniscus lens L12 having a concave surface directed toward the image side and on both surfaces of the double convex lens L24.

Next, numerical data of optical elements composing the zoom lens system of the third example are shown.

Numerical data 3

| surface distance | wide angle end | middle position | telephoto end |
|---|---|---|---|
| f | 11.25 | 16.09 | 21.59 |
| Fno. | 2.8500 | 3.1512 | 3.5064 |
| 2ω | 93.4° | 72.4° | 56.9° |
| $r_1 = 39.4656$ | $d_1 = 2.7000$ | $n_{d1} = 1.77250$ | $v_{d1} = 49.60$ |
| $r_2 = 19.1575$ | $d_2 = 3.8376$ | | |
| $r_3 = 23.4988$ | $d_3 = 2.9000$ | $n_{d1} = 1.80610$ | $v_{d3} = 40.92$ |
| $r_4 = 12.3518$ | $d_4 = 8.7545$ | | |
| (aspherical surface) | | | |
| $r_5 = -321.5338$ | $d_5 = 1.7500$ | $n_{d5} = 1.80440$ | $v_{d5} = 39.59$ |
| $r_6 = 38.1909$ | $d_6 = 5.6587$ | | |
| $r_7 = 51.8517$ | $d_7 = 4.2500$ | $n_{d7} = 1.74077$ | $v_{d7} = 27.79$ |
| $r_8 = -62.4189$ | $d_8 = D8$ | | |
| $r_9 = -49.8100$ | $d_9 = 1.7000$ | $n_{d9} = 1.88300$ | $v_{d9} = 40.76$ |
| $r_{10} = -634.3371$ | $d_{10} = 0.1000$ | | |
| $r_{11} = 76.0148$ | $d_{11} = 2.8000$ | $n_{d11} = 1.78472$ | $v_{d11} = 25.68$ |
| $r_{12} = 279.3232$ | $d_{12} = D12$ | | |
| $r_{13} = \infty$ | $d_{13} = 1.0000$ | | |
| (aperture stop) | | | |
| $r_{14} = 26.6837$ | $d_{14} = 3.5381$ | $n_{d14} = 1.53172$ | $v_{d14} = 48.84$ |
| $r_{15} = -58.7525$ | $d_{15} = 6.6753$ | | |
| $r_{16} = -105.7861$ | $d_{16} = 3.2705$ | $n_{d16} = 1.48749$ | $v_{d16} = 70.23$ |
| $r_{17} = -16.5092$ | $d_{17} = 1.6600$ | $n_{d17} = 1.83481$ | $v_{d17} = 42.72$ |
| $r_{18} = 483.0727$ | $d_{18} = 0.5116$ | | |
| $r_{19} = 31.5949$ | $d_{19} = 9.6340$ | $n_{d19} = 1.58913$ | $v_{d19} = 61.14$ |
| (aspherical surface) | | | |
| $r_{20} = -24.9249$ | $d_{20} = 0.3176$ | | |
| (aspherical surface) | | | |
| $r_{21} = -43.5703$ | $d_{21} = 1.3700$ | $n_{d21} = 1.80440$ | $v_{d21} = 39.59$ |
| $r_{22} = 23.2096$ | $d_{22} = 7.6628$ | $n_{d22} = 1.48749$ | $v_{d22} = 70.23$ |
| $r_{23} = -18.8170$ | $d_{23} = D23$ | | |
| $r_{24} = \infty$ | $d_{24} = 4.6500$ | $n_{d24} = 1.51633$ | $v_{d24} = 64.14$ |
| $r_{25} = \infty$ | $d_{25} = 1.0000$ | | |
| $r_{26} = \infty$ | $d_{26} = 0$ | | |
| (image surface) | | | | aspherical data the fourth surface $K = -1.2568$
$A_4 = 4.0845 \times 10^{-5}$   $A_6 = 7.9534 \times 10^{-9}$   $A_8 = 1.4928 \times 10^{-10}$
$A_{10} = -6.6801 \times 10^{-13}$ the nineteenth surface $K = -2.9863$
$A_4 = 6.2363 \times 10^{-9}$   $A_6 = 3.8233 \times 10^{-8}$   $A_8 = 2.5629 \times 10^{-10}$
$A_{10} = -3.2996 \times 10^{-12}$ the twentieth surface $K = -1.2082$
$A_4 = 2.6128 \times 10^{-5}$   $A_6 = 2.9162 \times 10^{-8}$   $A_8 = -2.7710 \times 10^{-10}$
$A_{10} = 0$ zoom data

| surface distance | wide angle end | middle position | telephoto end |
|---|---|---|---|
| (when focusing at infinite-distance object point) | | | |
| D8 | 3.67042 | 3.67042 | 3.67042 |
| D12 | 30.02014 | 12.13323 | 1.54340 |
| D23 | 30.83039 | 39.33862 | 49.00113 |
| (when foccusing at object point of 0.4 m) | | | |
| D8 | 1.05911 | 1.14556 | 1.15380 |
| D12 | 32.41585 | 14.44961 | 3.85223 |

Next, numerical values corresponding to the conditions according to the present invention in each example are shown in the following table 1.

TABLE 1

| Example | First Example | Second Example | Third Example |
|---|---|---|---|
| $0.2 < d6/|f1G| < 0.5$ | 0.28 | 0.29 | 0.29 |
| $0.3 < |f1G|/GD1 < 0.7$ | 0.48 | 0.51 | 0.51 |
| $0.3 < DS/|f1G| < 0.9$ | 0.72 | 0.58 | 0.69 |
| $0.9 < ft/|f1G| < 1.3$ | 1.12 | 1.06 | 1.11 |
| ft | 21.57 | 21.58 | 21.59 |
| f1 | 19.21 | 20.34 | 19.51 |
| D6 (distance between L13 and L14) | 5.36 | 5.86 | 5.66 |
| GD1 | 39.97 | 39.95 | 38.12 |
| DS | 13.850 | 11.850 | 13.420 |

FOURTH EXAMPLE

Figure 10A:
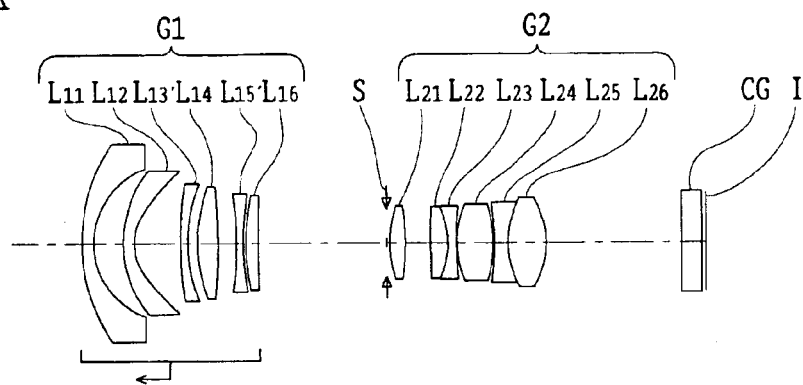
FIGS. 10A, 10B and 10C are sectional views showing an optical arrangement developed along the optical axis at the wide angle end, the middle position and the telephoto end respectively of the zoom lens system in a fourth example.
Figure 10B:
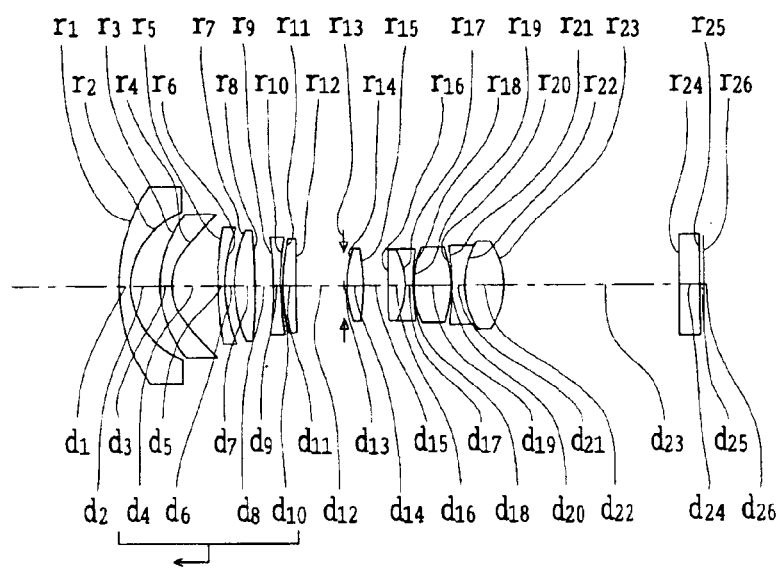
Figure 10C:
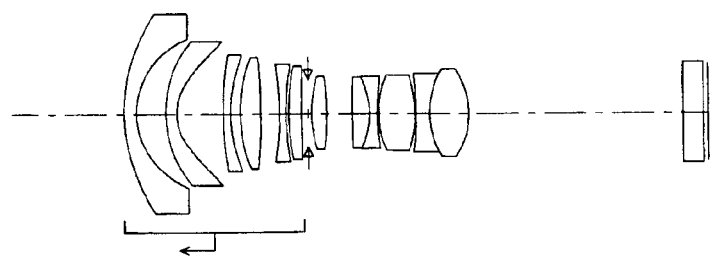
Figures 11A, 11B, 11C, 11D:
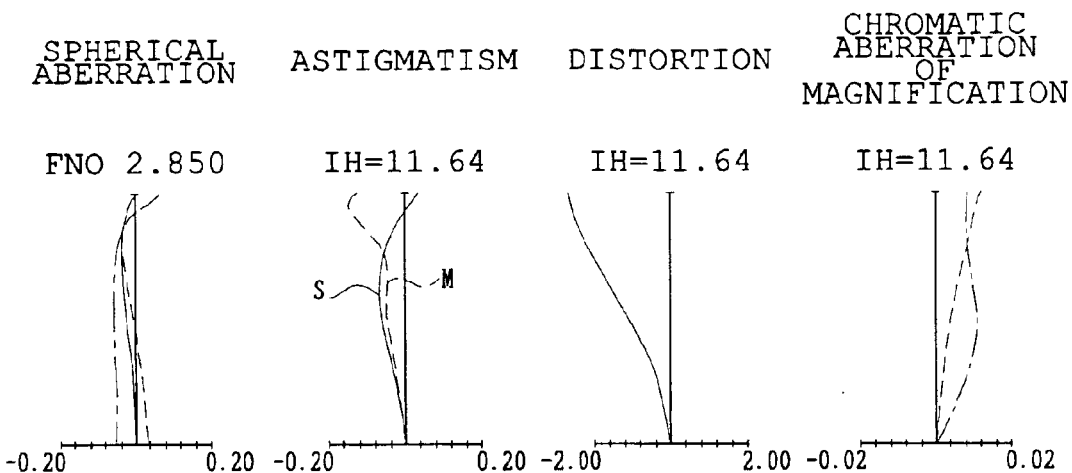
FIGS. 11A to 11D, 11E to 11H and 11I to 11L are aberration diagrams showing spherical aberration, astigmatism, distortion and chromatic aberration of magnification at the wide angle end, the middle position and the telephoto end respectively, when focusing of the zoom lens system is carried out at the infinite distance of the zoom lens system, in the fourth example.
Figures 11E, 11F, 11G, 11H:
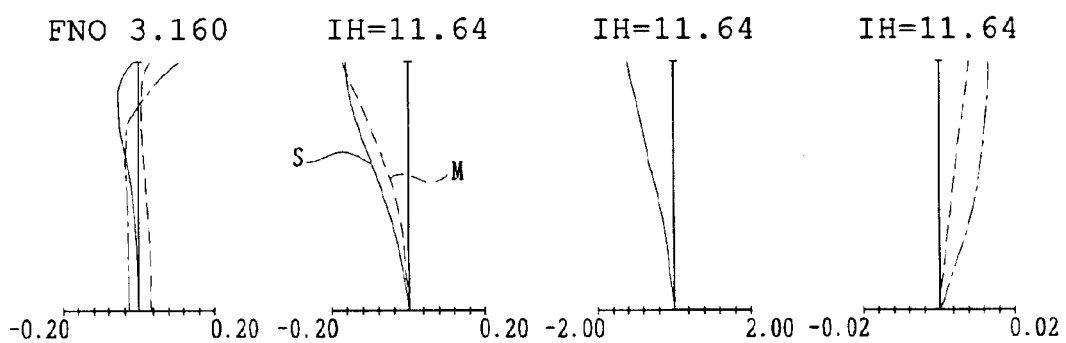
Figures 11I, 11J, 11K, 11L:
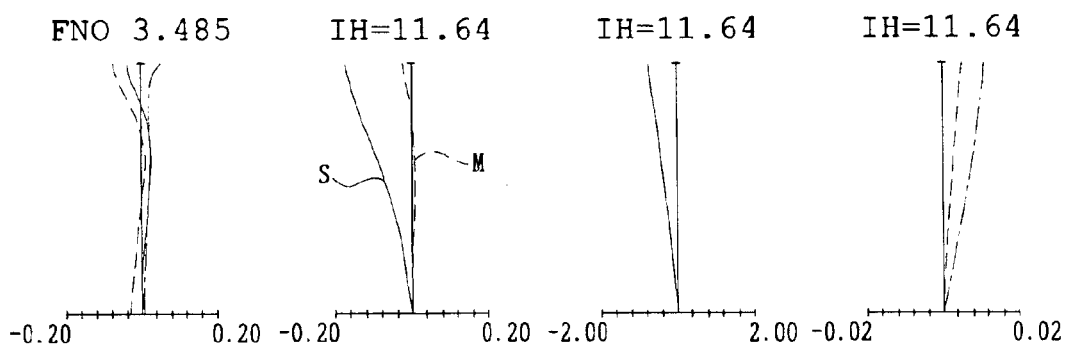

FIGS. 10A, 10B and 10C are sectional views showing an optical arrangement developed along the optical axis at the wide angle end, the middle position and the telephoto end respectively in the fourth example of zoom lens system according to the present invention. FIGS. 11A to 11D, 11E to 11H and 11I to 11L are aberration diagrams showing spherical aberration, astigmatism, distortion and chromatic aberration of magnification at the wide angle end, the middle position and the telephoto end respectively of the zoom lens in the fourth example, when focusing of the zoom lens system is carried out at infinite distance.

In the zoom lens of the fourth example, in order from an object side, a first lens group G1, an aperture stop S and a second lens group G2 are arranged. In FIG. 10A, the reference symbol CG represents a low pass filter, a near-infrared light cut filter and a CCD cover glass by replacing them with an equivalent optical element in form of a parallel flat plate. The reference symbol I shows an imaging surface.

The first lens group G1 comprises, in order from the object side, a negative meniscus lens L11 having a concave surface toward an image side, a negative meniscus lens L12 having a concave surface toward the image side, a negative meniscus lens L13' having a concave surface toward the image side, a double convex lens L14, a double concave lens 15' and a positive meniscus lens L16 having a convex surface directed toward the object side. The first lens group G1 has negative refracting power as a whole.

The second lens group G2 comprises, in order from the object side, a double convex lens L21, a cemented lens having a positive meniscus lens L22 with a concave surface directed toward the object side and a double concave lens L23, a double convex lens L24 and a cemented lens having a double concave lens L25 and a double convex lens L26. The second lens group G2 has positive refracting power as a whole.

When zooming is carried out from the wide angle end to the telephoto end, the first lens group G1 moves to the image side and the second lens group G2 moves together with the aperture stop S to the object side. Focusing from the infinite distance to very close range in one of the zooming states from the wide angle end to the telephoto end is carried out by moving the whole first lens group G1 integrally toward the image side and fixing the second lens group G2. In focusing, other methods of moving, such as moving two or more lenses in the first lens group G1, or extending the whole zoom lenses, can be used.

Aspherical surfaces are formed on a surface at the image side of the negative meniscus lens L12 having a concave surface directed toward the image side and on both surfaces of the double convex lens L24.

Next, numerical data of optical elements composing the zoom lens system of the fourth example are shown.

Numerical data 4

| surface distance | wide angle end | middle position | telephoto end | | |
|---|---|---|---|---|---|
| f | 11.08 | 16.08 | 21.17 | | |
| Fno. | 2.8500 | 3.16 | 3.49 | | |
| 2ω | 90.3° | 69.4° | 55.5° | | |
| $r_1$ = 40.0655 | $d_1$ = 2.7 | | $n_{d1}$ = 1.7725 | $ν_{d1}$ = 49.6 |
| $r_2$ = 17.5863 | $d_2$ = 6.612 | | | |
| $r_3$ = 25.7506 | $d_3$ = 2.9 | | $n_{d3}$ = 1.8061 | $ν_{d3}$ = 40.92 |
| $r_4$ = 12.0877 (aspherical surface) | $d_4$ = 10.3938 | | | |
| $r_5$ = 76.6337 | $d_5$ = 1.6 | | $n_{d5}$ = 1.8044 | $ν_{d5}$ = 39.59 |
| $r_6$ = 35.3282 | $d_6$ = 2.1363 | | | |
| $r_7$ = 33.4764 | $d_7$ = 4.7115 | | $n_{d7}$ = 1.72825 | $ν_{d7}$ = 28.46 |
| $r_8$ = −185.2077 | $d_8$ = D8 | | | |
| $r_9$ = −89.4707 | $d_9$ = 1.5 | | $n_{d9}$ = 1.883 | $ν_{d9}$ = 40.76 |
| $r_{10}$ = 75.9172 | $d_{10}$ = 0.291 | | | |
| $r_{11}$ = 52.6242 | $d_{11}$ = 3 | | $n_{d11}$ = 1.76182 | $ν_{d11}$ = 26.52 |
| $r_{12}$ = 441.0221 | $d_{12}$ = D12 | | | |
| $r_{13}$ = (aperture stop) | $d_{13}$ = 1 | | | |
| $r_{14}$ = 32.9566 | $d_{14}$ = 3.4867 | | $n_{d14}$ = 1.56732 | $ν_{d14}$ = 42.82 |
| $r_{15}$ = −63.1956 | $d_{15}$ = 5.5488 | | | |
| $r_{16}$ = 509.8453 | $d_{16}$ = 3.9566 | | $n_{d16}$ = 1.497 | $ν_{d16}$ = 81.54 |
| $r_{17}$ = −18.2618 | $d_{17}$ = 1.7488 | | $n_{d17}$ = 1.804 | $ν_{d17}$ = 46.57 |
| $r_{18}$ = 56.1153 | $d_{18}$ = 0.1174 | | | |
| $r_{19}$ = 23.7029 (aspherical surface) | $d_{19}$ = 8.1876 | | $n_{d19}$ = 1.58313 | $ν_{d19}$ = 59.38 |
| $r_{20}$ = −25.8538 (aspherical surface) | $d_{20}$ = 0.1076 | | | |
| $r_{21}$ = −53.7863 | $d_{21}$ = 2.9145 | | $n_{d21}$ = 1.8061 | $ν_{d21}$ = 40.92 |
| $r_{22}$ = 20.0996 | $d_{22}$ = 8.9527 | | $n_{d22}$ = 1.497 | $ν_{d22}$ = 81.54 |
| $r_{23}$ = −19.0753 | $d_{23}$ = D23 | | | |
| $r_{24}$ = ∞ | $d_{24}$ = 4.65 | | $n_{d24}$ = 1.51633 | $ν_{d24}$ = 64.14 |
| $r_{25}$ = ∞ | $d_{25}$ = 1 | | | |
| $r_{26}$ = ∞ (image surface) | $d_{26}$ = 0 | | | | aspherical data the fourth surface

K = −0.9686
$A_4$ = 1.3528 × 10$^{-5}$   $A_6$ = −2.1707 × 10$^{-8}$   $A_8$ = 1.0537 × 10$^{-10}$
$A_{10}$ = −1.4357 × 10$^{-12}$ the nineteenth surface K = −2.5267
$A_4$ = 1.0220 × 10$^{-5}$   $A_6$ = 5.0542 × 10$^{-8}$   $A_8$ = −4.7099 × 10$^{-10}$ the twentieth surface K = −1.1009
$A_4$ = 2.8262 × 10$^{-5}$   $A_6$ = 2.5189 × 10$^{-8}$   $A_8$ = −4.7553 × 10$^{-10}$
$A_{10}$ = 0 zoom data
(when focusing at infinite-distance object point)

| surface distance | wide angle end | middle position | telephoto end |
|---|---|---|---|
| D8 | 4.55446 | 4.55446 | 4.55446 |
| D12 | 28.71626 | 10.80422 | 1.26559 |
| D23 | 31.30349 | 40.12841 | 49.10450 |

FIFTH EXAMPLE

Figure 12A:
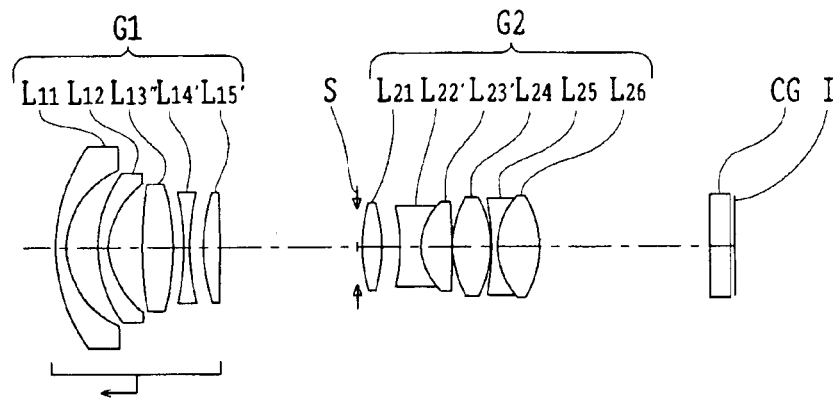
FIGS. 12A, 12B and 12C are sectional views showing an optical arrangement developed along the optical axis at the wide angle end, the middle position and the telephoto end respectively of the zoom lens system in a fifth example.
Figure 12B:
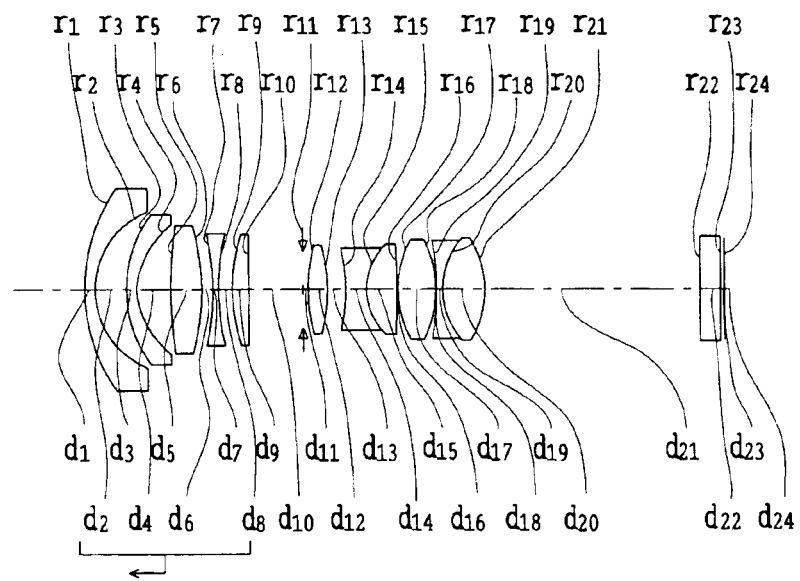
Figure 12C:
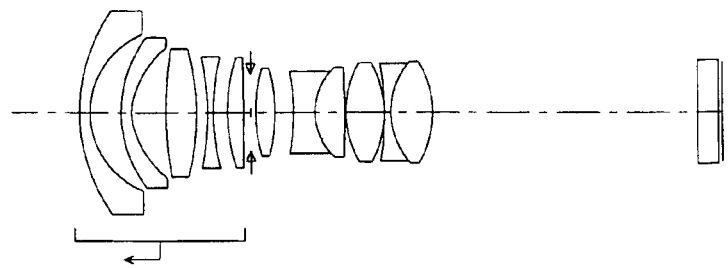
Figures 13A, 13B, 13C, 13D:
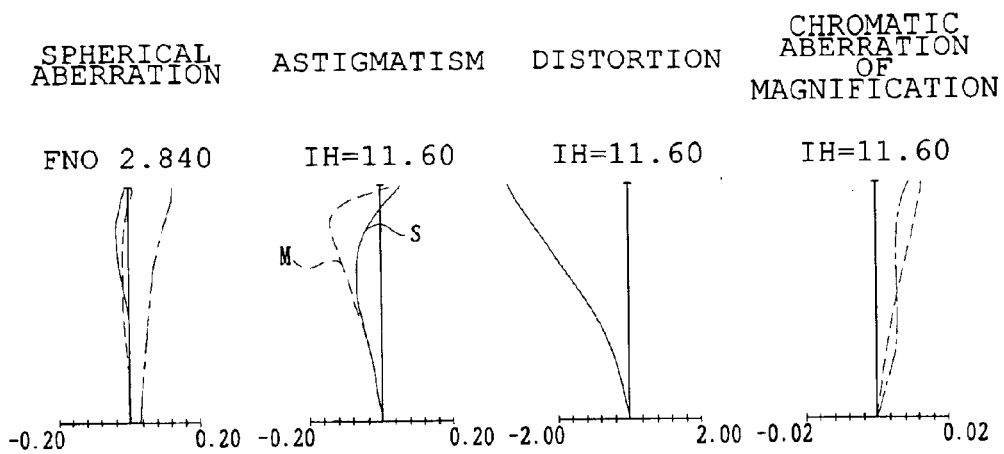
FIGS. 13A to 13D, 13E to 13H and 13I to 13L are aberration diagrams showing spherical aberration, astigmatism, distortion and chromatic aberration of magnification at the wide angle end, the middle position and the telephoto end respectively, when focusing of the zoom lens system is carried out at the infinite distance of the zoom lens system in the fifth example.
Figures 13E, 13F, 13G, 13H:
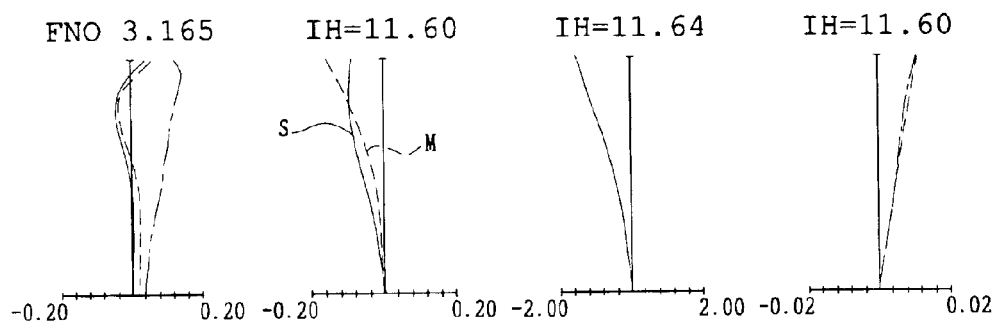
Figures 13I, 13J, 13K, 13L:
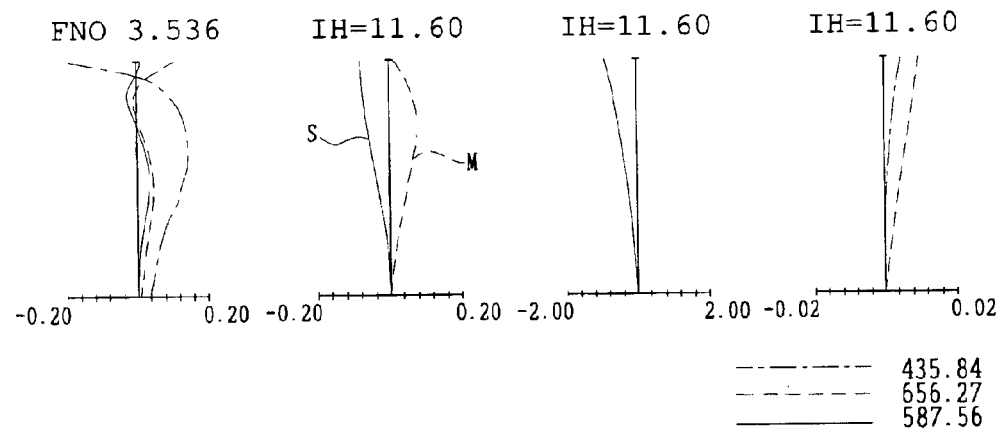

FIGS. 12A, 12B and 12C are sectional views showing an optical arrangement developed along the optical axis at the wide angle end, the middle position and the telephoto end respectively of the zoom lens system in the fifth example according to the present invention. FIGS. 13A to 13D, 13E to 13H and 13I to 13L are aberration diagrams showing spherical aberration, astigmatism, distortion and chromatic aberration of magnification at the wide angle end, the middle position and the telephoto end respectively of the zoom lens in the fifth example, when focusing of the zoom lens system is carried out at the infinite distance.

In the zoom lens of the fifth example, in order from the object side, a first lens group G1, an aperture stop S and a second lens group are arranged. In FIG. 12A, the reference symbol CG represents a low pass filter, a near-infrared light cut filter and a CCD cover glass by replacing them with an equivalent optical element in form of a parallel flat plate. The reference symbol I shows an imaging surface.

The first lens group G1 comprises, in order from the object side, a negative meniscus lens L11 having a concave surface toward an image side, a negative meniscus lens L12 having a concave surface toward the image side, a double convex lens L13", a double concave lens L14', a double convex lens L15'. The first lens group G1 has negative refracting power as a whole.

The second lens group G2 comprises, in order from the object side, a double convex lens L21, a cemented lens having a double concave lens L22' and a double convex lens L23', a double convex lens L24 and a cemented lens having a double concave lens L25 and a double convex lens L26. The second lens group G2 has positive refracting power as a whole.

When zooming is carried out from the wide angle end to the telephoto end, the first lens group G1 moves to the image side and the second lens group G2 moves together with the aperture stop S to the object side.

Focusing from the infinite distance to very close range in one of the zooming states from the wide angle end to the telephoto end is carried out by moving the whole first lens group G1 integrally toward the image side and fixing the second lens group G2. In focusing, other methods of moving, such as moving two or more lenses in the first lens group G1 or extending the whole zoom lenses, can be used.

Aspherical surfaces are formed on a surface at the image side of the negative meniscus lens L12 having a concave surface directed toward the image side, on a surface at the object side of the double convex lens L21, and on a surface at the object side of the double concave lens L25.

Next, numerical data of optical elements composing the zoom lens system of the sixth example are shown.

Numerical data 5

| surface distance | wide angle end | middle position | telephoto end | | |
|---|---|---|---|---|---|
| f | 11.03 | 16 | 21.4 | | |
| Fno. | 2.84 | 3.16 | 3.54 | | |
| 2ω | 90.6° | 69.7° | 55° | | |
| $r_1$ = 32.9626 | $d_1$ = 1.8 | | $n_{d1}$ = 1.788 | $ν_{d1}$ = 47.37 |
| $r_2$ = 15.4644 | $d_2$ = 5.7694 | | | |
| $r_3$ = 24.0647 | $d_3$ = 1.8 | | $n_{d3}$ = 1.8061 | $ν_{d3}$ = 40.73 |
| $r_4$ = 11.4 (aspherical surface) | $d_4$ = 6.4527 | | | |
| $r_5$ = 93.8265 | $d_5$ = 5.3657 | | $n_{d5}$ = 1.80518 | $ν_{d5}$ = 25.42 |
| $r_6$ = −70.6964 | $d_6$ = 2.3869 | | | |
| $r_7$ = −40.2675 | $d_7$ = 1 | | $n_{d7}$ = 1.8042 | $ν_{d7}$ = 46.5 |
| $r_8$ = 44.7290 | $d_8$ = 2.6883 | | | |
| $r_9$ = 35.4670 | $d_9$ = 3 | | $n_{d9}$ = 1.69895 | $ν_{d9}$ = 30.13 |
| $r_{10}$ = −338.3015 | $d_{10}$ = D10 | | | |
| $r_{11}$ = (aperture stop) | $d_{11}$ = 1 | | | |
| $r_{12}$ = 28.7903 (aspherical surface) | $d_{12}$ = 3.5478 | | $n_{d12}$ = 1.7433 | $ν_{d12}$ = 49.33 |
| $r_{13}$ = −37.5026 | $d_{13}$ = 3.5016 | | | |
| $r_{14}$ = −27.9954 | $d_{14}$ = 3.8932 | | $n_{d4}$ = 1.804 | $ν_{d14}$ = 46.57 |

-continued

Numerical data 5

| | | | |
|---|---|---|---|
| $r_{15} = 11.7093$ | $d_{15} = 5.55$ | $n_{d15} = 1.48749$ | $v_{d15} = 70.23$ |
| $r_{16} = -153.6895$ | $d_{16} = 0.1534$ | | |
| $r_{17} = 19.2930$ | $d_{17} = 7.3037$ | $n_{d17} = 1.57135$ | $v_{d17} = 52.95$ |
| $r_{18} = -18.9398$ | $d_{18} = 0.1$ | | |
| $r_{19} = -43.5264$ | $d_{19} = 0.9$ | $n_{d19} = 1.8061$ | $v_{d19} = 40.73$ |
| (asperical surface) | | | |
| $r_{20} = 14.1195$ | $d_{20} = 7.4898$ | $n_{d20} = 1.48749$ | $v_{d20} = 70.23$ |
| $r_{21} = -19.0456$ | $d_{21} = D21$ | | |
| $r_{22} = \infty$ | $d_{22} = 4.8$ | $n_{d22} = 1.54$ | $v_{d24} = 63$ |
| $r_{23} = \infty$ | $d_{23} = 2$ | | |
| $r_{24} = \infty$ | $d_{26} = 0$ | | |
| (image surface) | | | | aspherical data the fourth surface $K = -0.6654$
$A_4 = -1.1724 \times 10^{-5}$  $A_6 = -4.9913 \times 10^{-8}$
$A_8 = -1.5401 \times 10^{-10}$  $A_{10} = -2.0568 \times 10^{-12}$ the twelfth surface $K = -1.0297$
$A_4 = -5.4696 \times 10^{-6}$  $A_6 = 8.8924 \times 10^{-9}$
$A_8 = -7.5140 \times 10^{-10}$  $A_{10} = 4.6863 \times 10^{-12}$ the nineteenth surface $K = 13.9303$
$A_4 = -2.0674 \times 10^{-6}$  $A_6 = 1.1292 \times 10^{-7}$
$A_8 = 6.2119 \times 10^{-10}$  $A_{10} = -2.9356 \times 10^{-12}$ zoom data

| surface distance | wide angle end | middle position | telephoto end |
|---|---|---|---|
| (when focusing at infinite-distance object point) | | | |
| D10 | 25.00349 | 9.69634 | 1.12206 |
| D21 | 29.39721 | 38.08129 | 47.54647 |
| (when foccusing at object point of 0.4 m) | | | |
| D10 | 26.59314 | 11.31564 | 2.75655 |

Next, numerical values corresponding to the conditions according to the present invention in each example are shown in the following table 2.

TABLE 2

| Example | First Example | Second Example | Third Example | Fifth Example |
|---|---|---|---|---|
| d12 | 6.74 | 6.68 | 5.55 | 3.50 |
| f2G | 33.77 | 34.31 | 33.57 | 30.82 |
| f1 | 34.78 | 35.01 | 38.69 | 22.42 |
| f23 | −36.59 | −36.17 | −33.00 | −18.73 |
| f4 | 25.60 | 25.25 | 25.58 | 17.98 |
| f56 | −734.60 | −579.44 | 1357.15 | −98.63 |
| SD26 | 23.47 | 24.43 | 25.99 | 15.9469 |
| GD26 | 22.76 | 23.60 | 25.76 | 15.70 |
| f1G | −19.21 | −19.51 | −19.02 | −17.64 |
| DS | 13.85 | 13.42 | 14.06 | 14.24 |
| d12/f2G | 0.20 | 0.19 | 0.17 | 0.11 |
| f1/f2G | 1.03 | 1.02 | 1.15 | 0.73 |
| f23/f2G | −1.08 | −1.05 | −0.98 | −0.61 |
| f4/f2G | 0.76 | 0.74 | 0.76 | 0.58 |
| f2G/f56 | −0.05 | −0.06 | 0.02 | −0.31 |
| GD26/SD26 | 0.97 | 0.97 | 0.99 | 0.98 |
| SD26/f2G | 0.67 | 0.69 | 0.77 | 0.51 |
| |f1G|/DS | 1.39 | 1.45 | 1.35 | 1.24 |

The zoom lens system of the invention explained above is applicable to a silver salt or a digital single-lens reflex camera. These are exemplified below.

Figure 14:
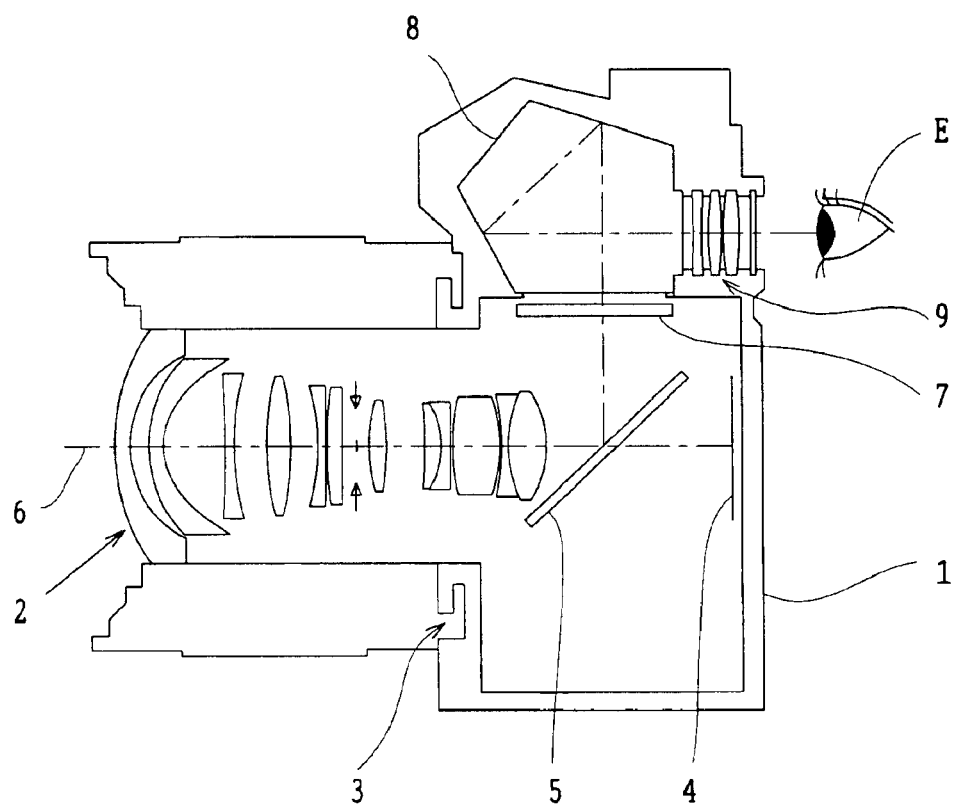
FIG. 14 is a sectional view showing a single-lens reflex camera in which a zoom lens system of the present invention is used as a taking lens and a small-sized CCD or C-MOS or the like is used as an image pickup device.

FIG. 14 is a sectional view showing a single-lens reflex camera in which the zoom lens system of the invention is used for a taking lens and small-sized CCD, C-MOS or the like is adopted as an image sensor. In FIG. 14, the reference numeral 1 represents a single-lens reflex camera, 2 is a taking lens, and 3 is a mount portion which enables to attach and detach the taking lens 2 at the single lens reflex camera 1, wherein screw type, byonet type mount or the like can be used. In this example, a mount of byonet type is used. The reference numeral 4 is a surface of an image pickup device, 5 is a quick return mirror arranged between the lens system on the optical path 6 of taking lens 2 and the image pickup device surface, 7 is a finder screen arranged at the optical path reflected from the quick return mirror, 8 is a penta prism, 9 is a finder and the reference symbol E is an eye-point of an observer. As the taking lens 2 of the single-lens reflex camera 1 having such constitution, the zoom lens system of the invention shown in each example mentioned above can be used.

What is claimed is:

1. A zoom lens system comprising, in order from an object side, a first lens group having negative refracting power and a second lens group having positive refracting power, wherein zooming is carried out at least by changing the distance between the groups, and the first lens group comprises six lenses which are, in order from the object side, a first lens which has meniscus form, negative refracting power and a concave surface toward an image side, a second lens which has meniscus form, negative refracting power and a concave surface toward the image side, a third lens which has negative refracting power and a concave surface toward the image side, a fourth lens which has positive refracting power and double convex surfaces, a fifth lens which has negative refracting power, and a sixth lens which has positive refracting power.

2. The zoom lens system according to claim 1, wherein the second lens group comprises at least two sets of cemented lens containing a positive lens and a negative lens.

3. The zoom lens system according to claim 1, wherein the second lens group comprises at least one single lens having positive refracting power and double convex aspherical surfaces.

4. The zoom lens system according to claim 1, wherein the following condition is satisfied, $$0.3 < |f1G|/GD1 < 0.7$$

where GD1 is a total length of the first lens group, and f1G is a focal length of the first lens group.

5. The zoom lens system according to claim 1, wherein the following condition is satisfied, $$0.3 < DS/|f1G| < 0.9$$

where DS is a distance between the first lens group and the second lens group when a focal length of the entire zoom lens system is −0.8 times of a focal length of the first lens group, and f1G is the focal length of the first lens group.

6. The zoom lens system according to claim 5, wherein the following condition is satisfied, $$0.5 < DS/|f1G| < 0.8$$

where DS is the distance between the first lens group and the second lens when the focal length of the whole system is −0.8 times of the focal length of the first lens group, and f1G is the focal length of the first lens group.

7. The zoom lens system according to claim 5, wherein the following condition is satisfied, $$0.9 < ft/|f1G| < 1.3$$

where ft is a focal length of the entire zoom lens system at a telephoto end, and f1G is the focal length of the first lens group.

8. The zoom lens system according to claim 1, wherein principal ray at the utmost off the axis passes through in a range where a total angle of field at a wide angle end becomes 90° or more.

9. A camera using the zoom lens system according to claim 1.

10. The zoom lens system according to claim 1, wherein the first lens group consists of only six single lenses.

11. A zoom lens system comprising, in order from an object side, a first lens group having negative refracting power and a second lens group having positive refracting power, wherein zooming is carried out at least by changing the distance between the groups, and the first lens group comprises six lenses which are, in order from the object side, a first lens which has negative refracting power, a second lens which has negative refracting power, a third lens which has negative refracting power, a fourth lens which has positive refracting power, a fifth lens which has negative refracting power and a sixth lens which has positive refracting power, and the following condition is satisfied, $$0.2 < d6/|f1G| < 0.5$$

where d6 is an air space between the third lens and the fourth lens, and f1G is a focal length of the first lens group.

12. A zoom lens system comprising, in order from an object side, a first lens group having negative refracting power and a second lens group having positive refracting power, wherein zooming is carried out at least by changing the distance between the groups, and the first lens group G1 comprises, in order from the object side, a first lens which has meniscus form, negative refracting power and a concave surface toward an image side, a second lens which has meniscus form, negative refracting power and a concave surface toward the image side, a third lens which has negative refracting power and a concave surface toward the image side, a fourth lens which has positive refracting power, a fifth lens which has negative refracting power, and a sixth lens which has positive refracting power, and the following condition is satisfied, $$0.2 < d6/|f1G| < 0.5$$

where d6 is an air space between the third lens and the fourth lens, and f1G is a focal length of the first lens group.

13. A zoom lens system comprising, in order from an object side, a first lens group having negative refracting power and a second lens group having positive refracting power, wherein zooming is carried out at least by changing the distance between the groups, and an aperture stop is arranged between the first lens group and the second lens group, and the second lens group comprises, in order from an object side, a first lens having positive refracting power and double convex surfaces, a second lens having positive or negative refracting power, a third lens having refracting power with a sign different from that of the second lens, a fourth lens having positive refracting power and double convex surfaces, a fifth lens having negative refracting power and a sixth lens having positive refracting power and double convex surfaces, and the following condition is satisfied, $$0.07 < d12/f2G < 0.30$$

where d12 is an air space on an optical axis between the first lens and the second lens in the second lens group, and f2G is a focal length of the second lens group.

14. The zoom lens system according to claim 13, wherein the second lens in the second lens group has positive refracting power and the third lens in the second lens group has negative refracting power.

15. The zoom lens system according to claim 14, wherein the second lens and the third lens in the second lens group are cemented and the fifth lens and the sixth lens in the second lens group are cemented.

16. The zoom lens system according to claim 13, wherein the second lens in the second lens group has negative refracting power and the third lens in the second lens group has positive refracting power.

17. The zoom lens system according to claim 16, wherein the second lens and the third lens in the second lens group are cemented and the fifth lens and the sixth lens in the second lens group are cemented.

18. The zoom lens system according to claim 13, wherein the following condition is satisfied, $$0.15 < d12/f2G < 0.25$$

where d12 is the air space on the optical axis between the first lens and the second lens in the second lens group, and f2G is the focal length of the second lens group.

19. The zoom lens system according to claim 13, wherein the following condition is satisfied, $$0.07 < d12/f2G < 0.17$$

where d12 is the air space on the optical axis between the first lens and the second lens in the second lens group, and f2G is the focal length of the second lens group.

20. The zoom lens system according to claim 13, wherein the fourth lens in the second lens group is a single lens having at least an aspherical surface.

21. The zoom lens system according to claim 13, wherein a focal length of the first lens in the second lens group satisfies the following condition, $$0.5 < f1/f2G < 2.0$$

where f1 is the focal length of the first lens in the second lens group, and f2G is the focal length of the second lens group.

22. The zoom lens system according to claim 13, wherein a focal length of the first lens in the second lens group satisfies the following condition, $$0.8 < f1/f2G < 1.5$$

where f1 is the focal length of the first lens in the second lens group, and f2G is the focal length of the second lens group.

23. The zoom lens system according to claim 13, wherein the focal length of the first lens in the second lens group satisfies the following condition, $$0.5 < f1/f2G < 1.0$$

where f1 is the focal length of the first lens in the second lens group, and f2G is the focal length of the second lens group.

24. The zoom lens system according to claim 13, wherein a composite focal length of the second lens and the third lens in the second lens group satisfies the following condition, $$-2.0 < f23/f2G < -0.4$$

where f23 is the composite focal length of the second lens and the third lens in the second lens group, and f2G is the focal length of the second lens group.

25. The zoom lens system according to claim 13, wherein a composite focal length of the second lens and the third lens in the second lens group satisfies the following condition, $$-1.5 < f23/f2G < -0.8$$

where f23 is the composite focal length of the second lens and the third lens in the second lens group, and f2G is the focal length of the second lens group.

26. The zoom lens system according to claim 13, wherein a composite focal length of the second lens and the third lens in the second lens group satisfies the following condition, $$-1.0 < f23/f2G < -0.4$$

where f23 is the composite focal length of the second lens and the third lens in the second lens group, and f2G is the focal length of the second lens group.

27. The zoom lens system according to claim 13, wherein a focal length of the fourth lens in the second lens group satisfies the following condition, $$0.4 < f4/f2G < 1.5$$

where f4 is the focal length of the fourth lens in the second lens group, and f2G is the focal length of the second lens group.

28. The zoom lens system according to claim 27, wherein the focal length of the fourth lens in the second lens group satisfies the following condition, $$0.5 < f4/f2G < 1.0$$

where f4 is the focal length of the fourth lens in the second lens group, and f2G is the focal length of the second lens group.

29. The zoom lens system according to claim 13, wherein a composite focal length of the fifth lens and the sixth lens in the second lens group satisfies the following condition, $$0.5 < f2G/f56 < 0.1$$

where f2G is the focal length of the second lens group, f56 is the composite focal length of the fifth lens and the sixth lens in the second lens group.

30. The zoom lens system according to claim 13, wherein a composite focal length of the fifth lens and the sixth lens in the second lens group satisfies the following condition, $$-0.1 < f2G/f56 < 0.05$$

where f2G is the focal length of the second lens group and f56 is the composite focal length of the fifth lens and the sixth lens in the second lens group.

31. The zoom lens system according to claim 13, wherein a composite focal length of the fifth lens and the sixth lens in the second lens group satisfies the following condition, $$-0.5 < f2G/f56 < 0$$

where f2G is the focal length of the second lens group, and f56 is the composite focal length of the fifth lens and the sixth lens in the second lens group.

32. The zoom lens system according to claim 13, wherein the second lens to the sixth lens in the second lens group satisfy the following condition, $$0.8 < GD26/SD26 < 1$$

where GD26 is a total thickness on an optical axis of the first, second, third, fourth, fifth and sixth lenses in the second lens group, and SD26 is a length on the optical axis from a surface at the object side of the second lens to a surface at the image side of the sixth lens in the second lens group.

33. The zoom lens system according to claim 32, satisfying the following condition, $$0.9 < GD26/SD26 < 1$$

where GD26 is the total thickness on the optical axis of the first, second, third, fourth, fifth and sixth lenses in the second lens group, and SD26 is the length on the optical axis from the surface at the object side of the second lens to the surface at the image side of the sixth lens in the second lens group.

34. The zoom lens system according to claim 13, wherein the second lens to the sixth lens in the second lens group satisfy the following condition, $$0.4 < SD26/f2G < 1$$

where SD26 is a length on an optical axis from a surface at the object side of the second lens to a surface at the image side of the sixth lens in the second lens group, and f2G is the focal length of the second lens group.

35. The zoom lens system according to claim 34, satisfying the following condition, $$0.5 < SD26/f2G < 0.9$$

where SD26 is the length on the optical axis from the surface at the object side of the second lens to the surface at the image side of the sixth lens in the second lens group, and f2G is the focal length of the second lens group.

36. The zoom lens system according to claim 13, wherein a distance between a surface at the image side in the first lens group and a surface at the object side in the second lens group satisfies the following condition, $$1 < |f1G|/DS < 3$$

where f1G is a focal length of the first lens group, and DS is the distance between the surface at the image side in the first lens group and the surface at the object side in the second lens group when a focal length of the entire zoom lens system is −0.8 times of a focal length of the first lens group.

37. The zoom lens system according to claim 36, satisfying the following condition, $$1.2 < |f1G|/DS < 2$$

where f1G is the focal length of the first lens group, and DS is the distance between the surface at the image side in the first lens group and the surface at the object side in the second lens group when the focal length of the entire zoom lens system is −0.8 times of the focal length of the first lens group.

38. The zoom lens system according to claim 13, wherein the first lens group G1 comprises, in order from the object side, plural negative lenses having concave surfaces toward the image side, a positive lens, a negative lens and a positive lens.

39. The zoom lens system according to claim 38, wherein two negative lenses at the object side in the plural negative lenses are negative meniscus lenses.

40. The zoom lens system according to claim 38, wherein the positive lens arranged to follow the plural negative lenses is formed in double convex shape.

41. The zoom lens system according to claim 13, wherein an image is formed in a range where a total angle of field at a wide angle end is 90° or more.

42. The zoom lens system according to claim 13, consisting as two unit-zoom lens system having only two lens groups, which move when zooming is carried out.

43. A camera using the zoom lens system according to claim 13.

* * * * *